US008225160B2

(12) United States Patent
Suzuki et al.

(10) Patent No.: US 8,225,160 B2
(45) Date of Patent: Jul. 17, 2012

(54) DECODING APPARATUS, DECODING METHOD, AND RECORDING MEDIUM

(75) Inventors: Masanao Suzuki, Kawasaki (JP); Masakiyo Tanaka, Kawasaki (JP); Miyuki Shirakawa, Fukuoka (JP); Yoshiteru Tsuchinaga, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 320 days.

(21) Appl. No.: 12/654,447

(22) Filed: Dec. 18, 2009

(65) Prior Publication Data

US 2010/0174960 A1 Jul. 8, 2010

Related U.S. Application Data

(63) Continuation of application No. PCT/JP2007/062419, filed on Jun. 20, 2007.

(51) Int. Cl.
*G06F 11/30* (2006.01)

(52) U.S. Cl. .......................................... 714/746; 714/752

(58) Field of Classification Search .................. 714/746, 714/752
See application file for complete search history.

(56) References Cited

U.S. PATENT DOCUMENTS

| | | | | |
|---|---|---|---|---|
| 5,325,374 | A * | 6/1994 | Hoshi et al. | 714/759 |
| 5,485,469 | A * | 1/1996 | Suzuki | 714/774 |
| 5,751,743 | A * | 5/1998 | Takizawa | 714/774 |
| 5,781,561 | A * | 7/1998 | Machida et al. | 714/752 |
| 6,163,868 | A * | 12/2000 | Kondo et al. | 714/746 |
| 6,594,790 | B1 * | 7/2003 | Sato et al. | 714/746 |
| 6,629,283 | B1 * | 9/2003 | Toyama | 714/746 |
| 6,895,541 | B1 * | 5/2005 | Yellin | 714/746 |
| 6,898,322 | B2 * | 5/2005 | Semasa | 382/238 |
| 7,010,737 | B2 * | 3/2006 | Kondo et al. | 714/746 |
| 7,020,824 | B2 * | 3/2006 | Tanaka et al. | 714/755 |
| 7,103,819 | B2 * | 9/2006 | Kikuchi et al. | 714/752 |
| 7,139,960 | B2 * | 11/2006 | Shokrollahi | 714/752 |
| 7,372,997 | B2 * | 5/2008 | Kondo | 382/225 |
| 7,856,651 | B2 * | 12/2010 | Choi et al. | 725/136 |
| 2002/0141649 | A1 * | 10/2002 | Semasa | 382/238 |

(Continued)

FOREIGN PATENT DOCUMENTS

EP 1 087 379 A2 3/2001

(Continued)

OTHER PUBLICATIONS

Chinese Office Action issued May 24, 2011 in corresponding Chinese Patent Application 200780053405.X.

(Continued)

*Primary Examiner* — Yolanda L Wilson
(74) *Attorney, Agent, or Firm* — Staas & Halsey LLP

(57) ABSTRACT

A decoding apparatus includes a unit decoding and inversely quantizing coded data to obtain frequency domain audio signal data, a unit computing from the coded data one of the number of scale bits composed of the number of bits corresponding to the scale value of the coded data and the number of spectrum bits composed of the number of bits corresponding to the spectrum value of the coded data, a unit estimating a quantization error of the frequency domain audio signal data based on one of the number of scale bits and the number of spectrum bits of the coded data, a unit computing a correction amount based on the estimated quantization error and correct the frequency domain audio signal data obtained by the frequency domain data obtaining unit based on the computed correction amount, and a unit converting the corrected frequency domain audio signal data into the audio signal.

17 Claims, 22 Drawing Sheets

U.S. PATENT DOCUMENTS

| | | | | |
|---|---|---|---|---|
| 2006/0280160 | A1* | 12/2006 | Padovani et al. | 370/347 |
| 2007/0087756 | A1* | 4/2007 | Hoffberg | 455/450 |

FOREIGN PATENT DOCUMENTS

| | | |
|---|---|---|
| JP | 11-4449 | 1/1999 |
| JP | 2001-102930 | 4/2001 |
| JP | 2002-290243 | 10/2002 |
| JP | 2002-328698 | 11/2002 |
| JP | 2003-177797 | 6/2003 |
| JP | 2006-60341 | 3/2006 |

OTHER PUBLICATIONS

International Search Report for PCT/JP2007/062419, mailed Sep. 25, 2007.

Extended European Search Report dated May 10, 2012 issued in corresponding European Patent Application No. 07767257.4.

Marina Bosi et al., "ISO/IEC MPEG-2 Advanced Audio Coding", Journal of the Audio Engineering Society, vol. 45, No. 10, Oct. 1997, pp. 789-814.

* cited by examiner

FIG.11A

| SPECTRUM (QUANTIZED VALUE) | NUMBER OF BITS | HUFFMAN CODEWORD |
|---|---|---|
| 0 | 11 | 7F8 |
| 1 | 9 | 1F1 |
| : | : | : |
| 40 | 1 | 0 |
| : | : | : |
| 80 | 11 | 7F4 |

FIG.11B

| SCALE VALUE (DIFFERENCE) | NUMBER OF BITS | HUFFMAN CODEWORD |
|---|---|---|
| −60 | 18 | 3FFE8 |
| −59 | 18 | 3FFE6 |
| : | : | : |
| 0 | 1 | 0 |
| : | : | : |
| +60 | 19 | 7FFF3 |

DECODING APPARATUS, DECODING METHOD, AND RECORDING MEDIUM

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2007/062419 filed on Jun. 20, 2007, with the Japanese Patent Office, the entire contents of which are hereby incorporated by reference.

FIELD

The disclosures herein relate to an audio coding-decoding technology in which audio signals such as a sound or a piece of music are compressed and decompressed.

BACKGROUND

ISO/IEC 13818-7 International Standard MPEG-2 Advanced Audio Coding (AAC) is known as one example of a coding system in which an audio signal is converted to frequency-domain and the converted audio signal in the frequency domain is encoded. The AAC system is employed as an audio coding system such as one-segment broadcasting or digital AV apparatuses.

FIG. 1 illustrates a configuration example of an encoder 1 that employs the AAC system. The encoder 1 illustrated in FIG. 1 includes a MDCT (modified discrete cosine transform) section 11, a psychoacoustic analyzing section 12, a quantization section 13, and a Huffman coding section 14.

In the encoder 1, the MDCT section 11 converts an input sound into an MDCT coefficient composed of frequency domain data by the MDCT. In addition, the psychoacoustic analyzing section 12 conducts a psychoacoustic analysis on the input sound to compute a masking threshold for discriminating between acoustically significant frequencies and acoustically insignificant frequencies.

The quantization section 13 quantizes the frequency domain data by reducing the number of quantized bits in acoustically insignificant frequency domain data based on the masking threshold, and allocates a large number of quantized bits to acoustically significant frequency domain data. The quantization section 13 outputs a quantized spectrum value and a scale value, both of which are Huffman encoded by a Huffman encoding section 14 to be output from the encoder 1 as coded data. Notice that the scale value is a number that represents the magnification of a spectrum waveform of the frequency domain data converted from the audio signal and corresponds to an exponent in a floating-point representation of an MDCT coefficient. The spectrum value corresponds to a mantissa in the floating-point representation of the MDCT coefficient, and represents the aforementioned spectrum waveform itself. That is, the MDCT coefficient can be expressed by "spectrum value*$2^{scale\ value}$".

FIG. 2 illustrates a configuration example of an AAC system decoding apparatus 2. The decoding apparatus 2 includes a Huffman decoding section 21, an inverse quantization section 22, and an inverse MDCT section 23. The decoding apparatus 2 receives the coded data encoded by the encoder 1 illustrated in FIG. 1, and the coded data are then converted into a quantization value and a scale value by the Huffman decoding section 21. The inverse quantization section 22 converts the quantization value and scale value into inverse quantization values (MDCT coefficient), and the inverse MDCT section converts the MDCT coefficient to a time domain signal to output a decoded sound.

Notice that Japanese Laid-open Patent Publication No. 2006-60341, Japanese Laid-open Patent Publication No. 2001-102930, Japanese Laid-open Patent Publication No. 2002-290243, and Japanese Laid-open Patent Publication No. H11-4449 are given as related art documents that disclose technologies relating to quantization error correction.

When the quantization section 13 in the encoder 1 of FIG. 1 quantizes the MDCT coefficient, a quantization error illustrated in FIG. 3 may be generated. FIG. 3 illustrates a case where the MDCT coefficient in a post-quantization is larger than that in a pre-quantization; however, there is also a case where the MDCT coefficient in the post-quantization is smaller than that in the pre-quantization.

In general, the quality of a decoded sound may not be affected by the presence of the quantization error. However, in a case where an input sound has a large amplitude (approximately 0 dB) and a MDCT coefficient of the sound after quantization is larger than a MDCT coefficient of the sound before quantization, and compressed data of the sound is decoded by the decoding apparatus according to the related art, the amplitude of the sound may become large and may exceed the word-length (e.g., 16 bits) of the Pulse-code modulation (PCM). In this case, the portion exceeding the word-length of the PCM data may not be expressed as data and thus result in an overflow. Accordingly, an abnormal sound (i.e., sound due to clip) may be generated. For example, the sound due to clip is generated in a case where an input sound having a large amplitude illustrated in FIG. 4 that has once been encoded is decoded and the amplitude of the obtained decoded sound exceeds the word-length of the PCM data as illustrated in FIG. 5.

Specifically, the sound due to clip is likely to be generated when an audio sound is compressed at a low bit-rate (high compression). Since the quantization error that results in the sound due to clip is generated at an encoder, it may be difficult for the related art decoding apparatus to prevent the generation of the sound due to clip.

SUMMARY

According to an aspect of the embodiments, a decoding apparatus for decoding coded data obtained by encoding a scale value and a spectrum value of frequency domain audio signal data to output an audio signal, includes a frequency domain data obtaining unit configured to decode and inversely quantize the coded data to obtain the frequency domain audio signal data; a number-of-bits computing unit configured to compute from the coded data one of the number of scale bits composed of the number of bits corresponding to the scale value of the coded data and the number of spectrum bits composed of the number of bits corresponding to the spectrum value of the coded data; a quantization error estimating unit configured to estimate a quantization error of the frequency domain audio signal data based on one of the number of scale bits and the number of spectrum bits; a correcting unit configured to compute a correction amount based on the estimated quantization error and correct the frequency domain audio signal data obtained by the frequency domain data obtaining unit based on the computed correction amount; and a converting unit configured to convert the corrected frequency domain audio signal data corrected by the correcting unit into the audio signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 11A is a diagram illustrating an example of a Huffman codebook for spectrum value;

FIG. 11B is a diagram illustrating an example of a Huffman codebook for scale value;

DESCRIPTION OF EMBODIMENTS

Preferred embodiments will be described with reference to accompanying drawings. Notice that an AAC compatible decoding apparatus is given as an example to which each of the following embodiments is applied, however, the example to which each of the embodiments is applied is not limited thereto. Any audio encoding-decoding system may be given as an example to which each of the embodiments is applied, provided that the audio encoding-decoding system is capable of converting an audio signal into frequency domain data, encoding the converted frequency domain data as a spectrum value and a scale value, and decoding the encoded spectrum value and scale value.

First Embodiment

Figure 1:
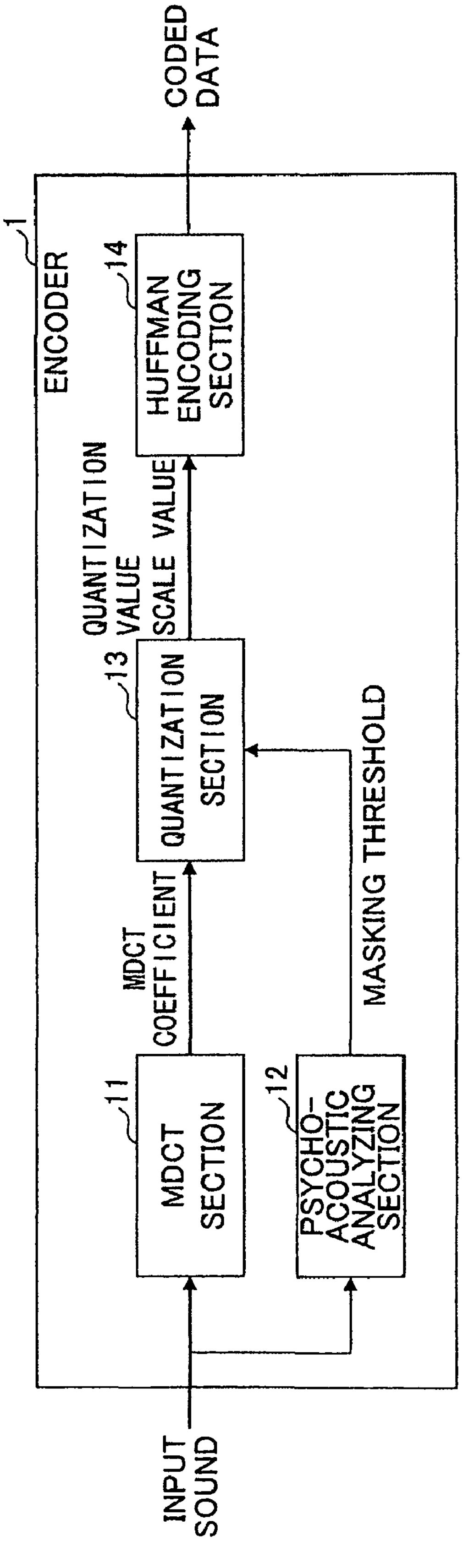
FIG. 1 is a diagram illustrating a configuration example of an encoder according to the related art.
Figure 2:
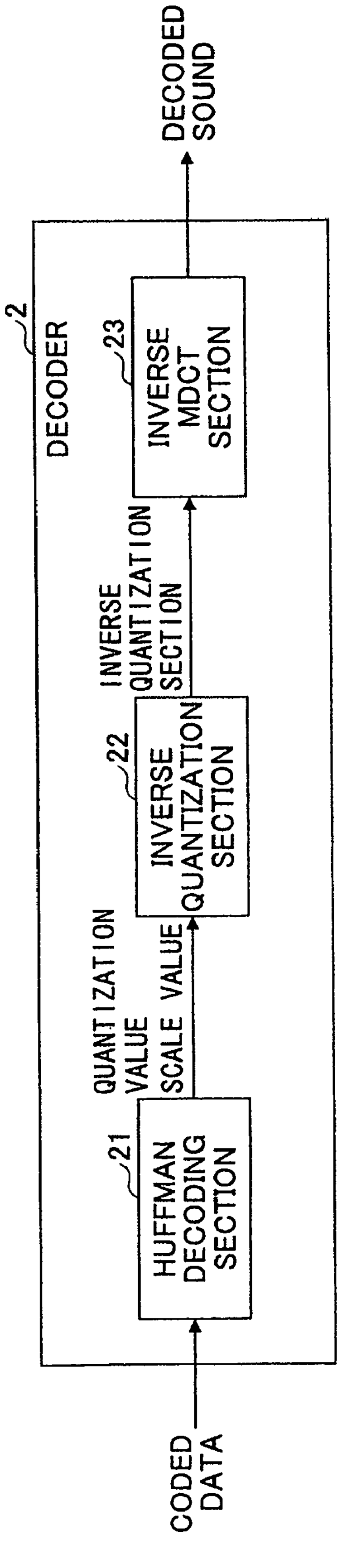
FIG. 2 is a diagram illustrating a configuration example of a decoding apparatus according to the related art.
Figure 3:
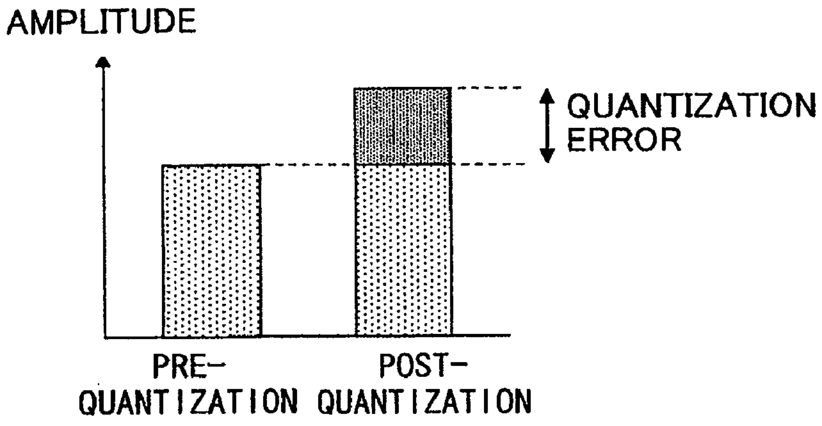
FIG. 3 is a diagram for explaining a quantization error.
Figure 4:
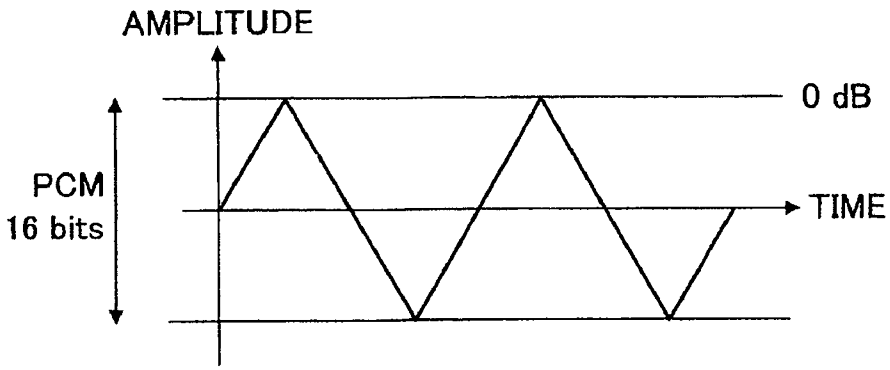
FIG. 4 is a diagram illustrating an example of an input sound.
Figure 5:
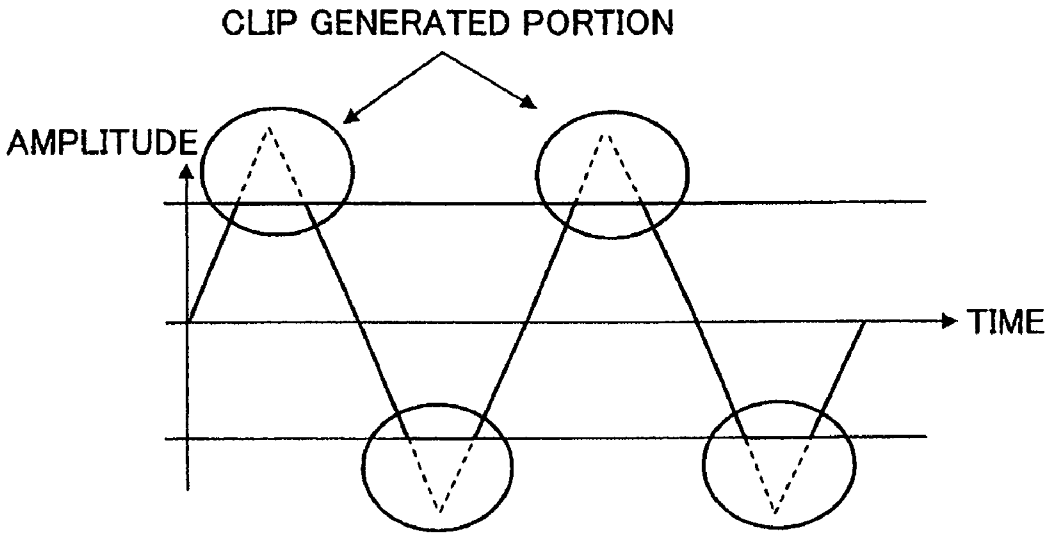
FIG. 5 is a diagram illustrating a decoded sound corresponding to the input sound illustrated in FIG. 4.
Figure 6:
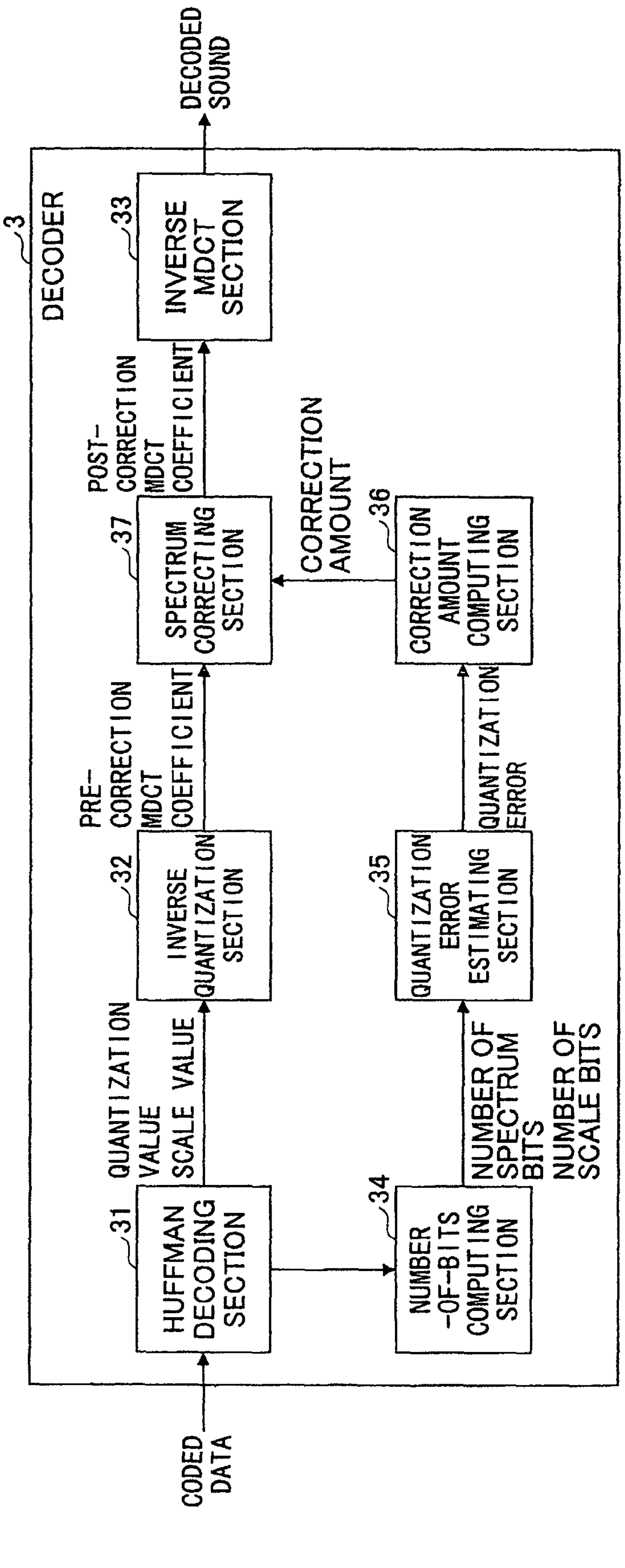
FIG. 6 is a diagram illustrating a configuration diagram illustrating a decoding apparatus according to a first embodiment.

FIG. 6 illustrates a configuration diagram illustrating a decoding apparatus according to a first embodiment. A decoding apparatus 3 according to the embodiment includes a Huffman decoding section 31, an inverse quantization section 32, an inverse MDCT section 33, a number-of-bits computing section 34, a quantization error estimating section 35, a correction amount computing section 36, and a spectrum correcting section 37.

In the decoding apparatus 3, the Huffman decoding section 31 decodes a Huffman codeword corresponding to a quantized spectrum value and a Huffman codeword corresponding to a scale value contained in the input coded data to compute a quantization value of the quantized spectrum value and the scale value. The inverse quantization section 32 inversely quantizes the quantization value to compute the spectrum value, thereby computing a pre-correction MDCT coefficient based on the spectrum value and scale value.

The Huffman decoding section 31 inputs the Huffman codeword corresponding to the quantized spectrum value contained in the input coded data and the Huffman codeword corresponding to the scale value into the number-of-bits computing section 34. The number-of-bits computing section 34 computes each of the number of bits of the Huffman codeword corresponding to the spectrum value (hereinafter also called "spectrum value codeword") and the number of bits of the Huffman codeword corresponding to the scale value (hereinafter also called "scale value codeword") and inputs the computed each of the number of bits of the Huffman codeword corresponding to the spectrum value and the number of bits of the Huffman codeword corresponding to the scale value into the quantization error estimating section 35. Hereinafter, the number of bits of the Huffman codeword corresponding to the spectrum value is called "the number of spectrum bits" and the number of bits of the Huffman codeword corresponding to the scale value is called "the number of scale bits".

The quantization error estimating section 35 estimates a quantization error based on one of, or both of the number of spectrum bits and the number of scale bits, and inputs the estimated quantization error into the correction amount computing section 36. The correction amount computing section computes a correction amount based on the estimated quantization error estimated by the quantization error estimating section 35, and inputs the computed correction amount into the spectrum correcting section 37. The spectrum correcting section 37 corrects the pre-correction MDCT coefficient based on the computed correction amount, outputs a post-correction MDCT coefficient into the inverse MDCT section 33. The inverse MDCT section 33 performs the inverse MDCT on the post-correction MDCT coefficient to output a decoded sound.

Subsequently, the description is given on the basic concepts of the correction of the MDCT coefficient performed by the number-of-bits computing section 34, the quantization error estimating section 35, the correction amount computing section 36, and the spectrum correcting section 37.

Figure 7:
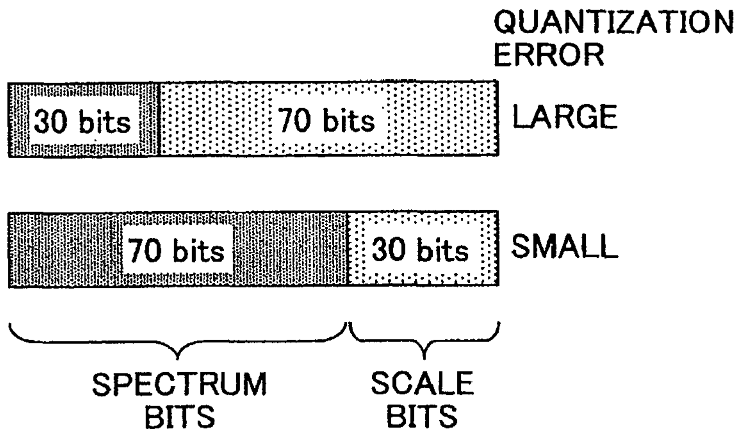
FIG. 7 is a diagram for explaining a relationship between the number of spectrum bits and the number of scale bits.

In the transform coding system such as the AAC system, the number of bits allocated to coded data (spectrum value codeword and scale value codeword) of the MDCT coefficient of one frame is predetermined based on a bit-rate of the coded data. Accordingly, within one frame, if the number of scale bits is large, the number of spectrum bits becomes small, whereas if the number of spectrum bits is large the number of scale bits becomes small. For example, as illustrated in FIG. 7, it is estimated that if there are a total number of 100 bits that can be allocated to the respective spectrum value codeword and scale value codeword and if the number of spectrum bits that can be allocated is 30 bits, the number of scale bits that can be allocated is 70 bits. On the other hand, if the number of spectrum bits that can be allocated is 70 bits, the number of scale bits that can be allocated is 30 bits. In addition, the number of bits that can be allocated for each frequency band is predetermined. That is, the relationship between the number of spectrum bits and the number of scale bits is formed such that if the number of scale bits is large, the number of spectrum bits is small, and the number of spectrum bits is large, the spectrum bits is small, for each frequency band. Notice that a frame is hereinafter defined as a unit of data that can independently be decoded into audio signals and that includes a certain number of samples.

As illustrated in FIG. 7, the fewer number of spectrum bits indicates a small amount of codes allocated to the spectrum value, and therefore the spectrum value is not precisely represented. Thus, the large quantization error is estimated. In contrast, the large number of scale bits indicates the small number of spectrum bits. Thus, the large quantization error is also estimated as similar to the aforementioned case. Since the large number of scale bits indicates that the large absolute value of the magnification of waveform, it is estimated that the waveform is not precisely represented. From this viewpoint, it is estimated that the quantization error is large if the number of scale bits is large. Conversely, if the number of scale bits is small, the small quantization error is estimated. Likewise, if the number of spectrum bits is small, the small quantization error is estimated.

Accordingly, the quantization error estimating section 35 estimates the quantization error based on the number of bits calculated by the number-of-bits computing section 34. The quantization error can be estimated if the total number of bits obtained by adding the number of spectrum bits to the number of scale bits is constant and one of the number of spectrum bits and the number of scale bits has been obtained in advance.

Further, even if the total number of spectrum bits and scale bits in one frame unit or one frequency band unit vary with a time factor, the number of bits that can be allocated to one frame or one frequency band is restricted. Accordingly, the relationship between the number of spectrum bits and the number of scale bits is formed with each frequency band such that if the number of scale bits is large, the number of spectrum bits is small, whereas if the number of spectrum bits is large, the spectrum bits is small. In such a case, the quantization error may be estimated based on the ratio of one of the number of spectrum bits and the number of scale bits to the total number of bits of the spectrum bits and the scale bits.

Figure 8:
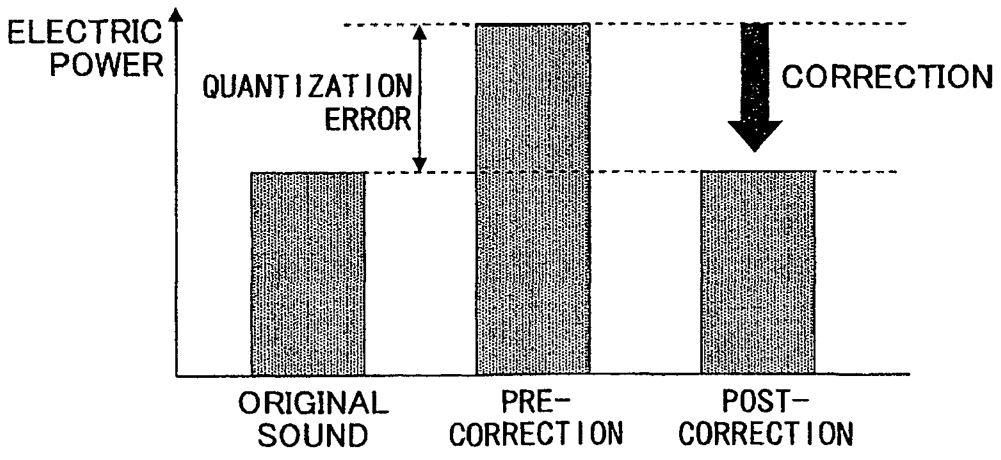
FIG. 8 is a diagram illustrating correction of MDCT coefficient.

The correction amount computing section 36 determines a correction amount such that if the quantization error is large, the correction amount of the MDCT coefficient becomes large, and thereafter, the spectrum correcting section 37 corrects the MDCT coefficient as illustrated in FIG. 8.

Figure 9:
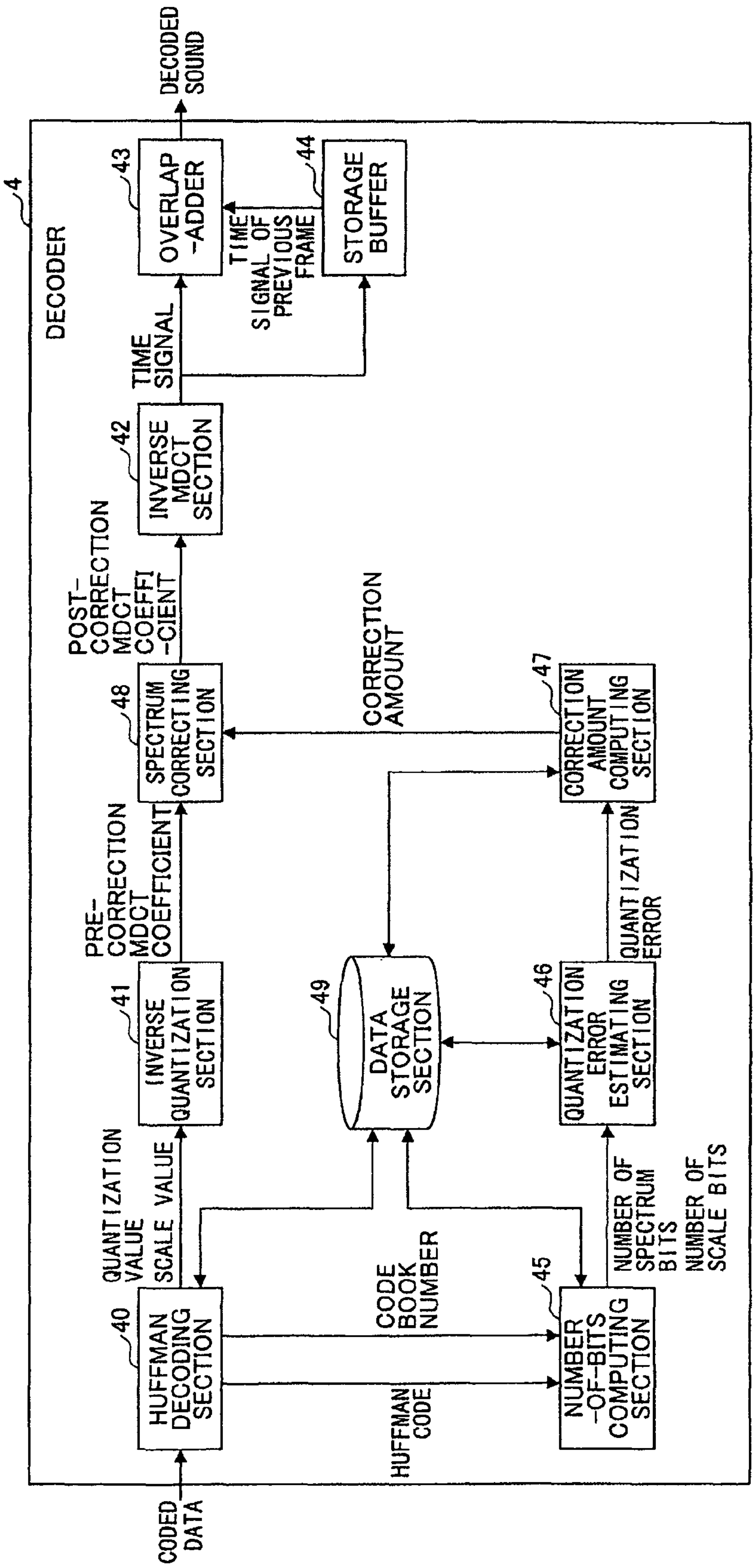
FIG. 9 is a detailed configuration diagram illustrating the decoding apparatus according to the first embodiment.

FIG. 9 illustrates the decoding apparatus according to the first embodiment illustrated in FIG. 6 in more detail. As illustrated in FIG. 9, a decoding apparatus 4 according to the first embodiment includes a Huffman encoding section 40, an inverse quantization section 41, an inverse MDCT section 42, an overlap-adder 43, a storage buffer 44, a number-of-bits computing section 45, a quantization error estimating section 46, a correction amount computing section 47, a spectrum correcting section 48, and a data storage section 49. The Huffman encoding section 40, the inverse quantization section 41, the inverse MDCT section 42, the number-of-bits computing section 45, the quantization error estimating section 46, the correction amount computing section 47, and the spectrum correcting section 48 include functions similar to the corresponding functions illustrated in FIG. 6. Moreover, the data storage section 49 stores data such as tables that may utilized for processing. In the AAC system, since the encoder encodes a signal by overlapping a certain interval of one frame block, the decoding apparatus decodes the coded data by allowing a time signal obtained in the inverse MDCT processing to be overlapped with a time signal of a previous frame, thereby outputting a decoded sound. Thus, the decoding apparatus 4 of FIG. 9 includes an overlap-adder 43 and a storage buffer 44.

Figure 10:
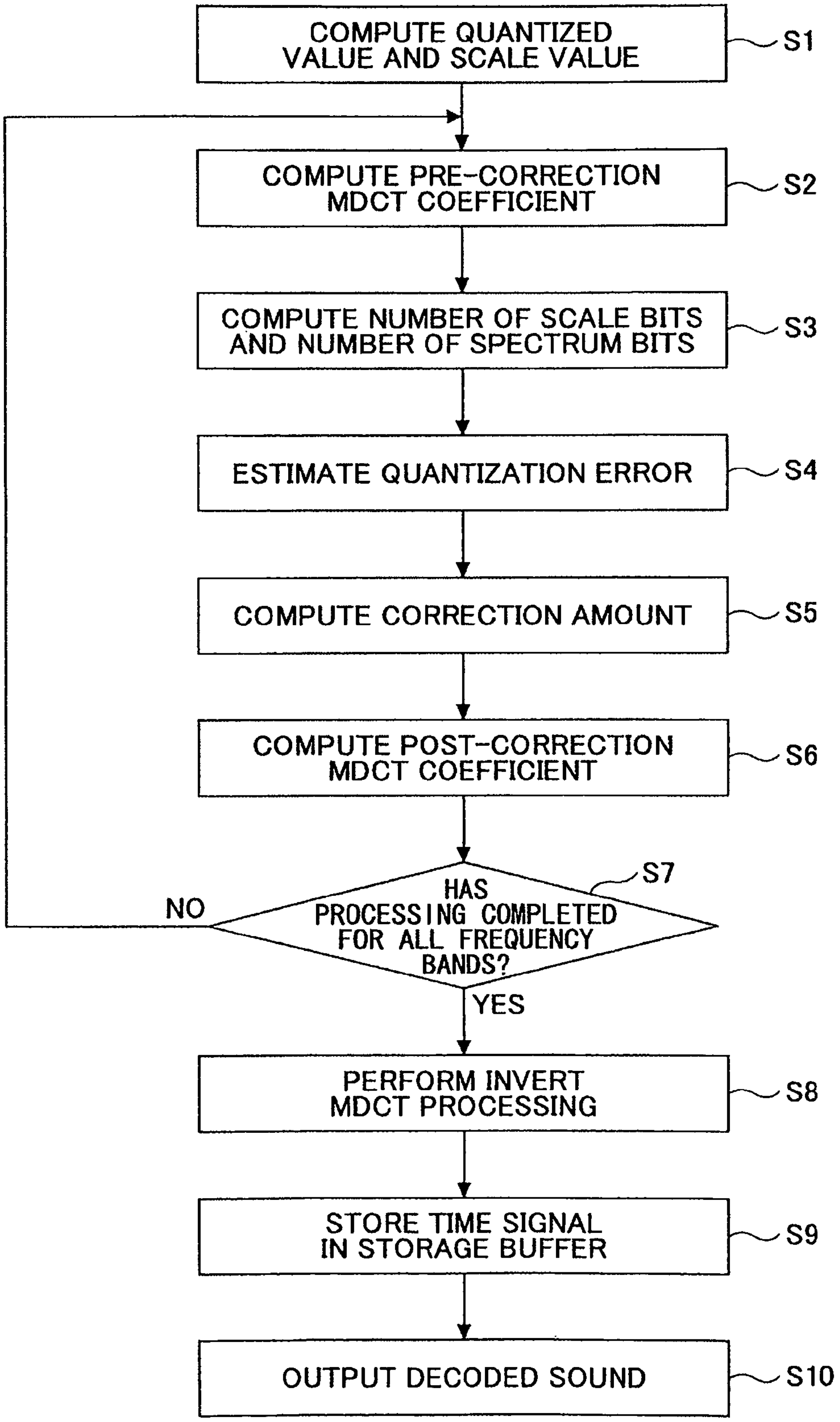
FIG. 10 is a flowchart for explaining operation of the decoding apparatus according to the first embodiment.

Next, the operation of the decoding apparatus 4 is described with reference to FIG. 10.

The decoding apparatus 4 receives a frame (hereinafter called a "current frame") of coded data. A Huffman decoding section 40 Huffman-decodes the received coded data to compute a spectrum value (quantization value) and a scale value of a MDCT coefficient for each frequency band (Step 1). Notice that in the AAC system, the number of frequency bands contained in one frame differs according to a range of sampling frequency in the frame. For example, in a case where a sampling frequency is 48 kHz, the maximum number of frequency bands within one frame is 49.

The Huffman decoding section 40 inputs the quantization value and scale value in one frequency band into the inverse quantization section 41, and the inverse quantization section 41 computes pre-correction MDCT coefficient (Step 2). In the mean time, the Huffman decoding section 40 inputs a Huffman codeword corresponding to the quantization value and a Huffman codeword corresponding to the scale value in the aforementioned frequency band, and also inputs respective codebook numbers, to which the respective Huffman codewords correspond, into the number-of-bits computing section 45. Then, the number-of-bits computing section 45 computes the number of bits of the respective Huffman codewords composed of the number of spectrum bits and the number of scale bits (Step 3).

The number-of-bits computing section 45 inputs the computed number of spectrum bits and number of scale bits into the quantization error estimating section 46, and the quantization error estimating section 46 computes a quantization error based on one of, or both of the number of spectrum bits and the number of scale bits (Step 4). Notice that in a case where the quantization error estimating section 46 estimates the quantization error based on one of the number of spectrum bits and the number of scale bits, the number-of-bits computing section 45 may compute only a corresponding one of the number of spectrum bits and the number of scale bits.

The quantization error computed by the quantization error estimating section 46 is input to the correction amount computing section 47, and the correction amount computing section 47 computes a correction amount corresponding to the pre-correction MDCT coefficient based on the computed quantization error (Step 5).

The correction amount computing section 47 inputs the computed correction amount into the spectrum correcting section 48, and the spectrum correcting section 48 corrects the pre-correction MDCT coefficient based on the computed correction amount to compute a MDCT coefficient after the correction (hereinafter called a "post-correction MDCT coefficient") (Step 6).

Thereafter, the decoding apparatus 4 carries out the processing performed in the steps 2 to 6 (Steps 2 to 6) for all frequency bands of the current frame (Step 7). When the spectrum correcting section 48 computes the post-correction MDCT coefficient for all the frequency bands of the current frame, the computed post-correction MDCT coefficient for all the frequency bands of the current frame is input to the inverse MDCT section 42. The inverse MDCT section 42 performs inverse MDCT processing on the post-correction MDCT coefficient for all the frequency bands of the current frame to output a time signal of the current frame (Step 8). The time signal output from the MDCT section 42 is input to the overlap-adder 43 and simultaneously stored in the storage buffer 44 (Step 9).

The overlap-adder 43 adds the time signal of the current frame supplied from the inverse MDCT section 42 and a time signal of the previous frame stored in the storage buffer 44, thereby outputting a decoded sound (Step 10).

Next, the respective processing performed by the number-of-bits computing section 45, the quantization error computation section 46, the correction amount computing section 47, and the spectrum correcting section 48 is described in detail. First, the processing of the number-of-bits computing section 45 is described.

The number-of-bits computing section 45 computes the number of spectrum bits and the number of scale bits. The number of spectrum bits and the number of scale bits are computed by respectively counting the number of bits of the spectrum value corresponding to a Huffman codeword and the number of bits of the scale value corresponding to a Huffman codeword. The number of spectrum bits and the number of scale bits may also be computed with reference to respective Huffman codebooks.

ISO AAC standard (13818-Part 7) employed by the embodiment includes standardized codebooks (tables) for Huffman coding. Specifically, one type of a codebook is specified for obtaining a scale value whereas 11 types of codebooks are specified for obtaining spectrum value. Notice that which types of codebooks is referred to is determined based on codebook information contained in the coded data.

FIG. 11A depicts one example of the Huffman codebook for the spectrum value and FIG. 11B depicts one example of the Huffman codebook for the scale value. As illustrated in FIGS. 11A and 11B, the Huffman codebooks each include a Huffman codeword, the number of bits of the Huffman codeword, and a spectrum value (a quantization value). Accordingly, the data storage section 49 of the decoding apparatus 4 stores the codebooks, and the number-of-bits computing section 45 obtains the number of spectrum bits and the number of scale bits by referring to the respective Huffman codebooks based on the respective Huffman codewords contained in the coded data.

For example, as illustrated in FIG. 11A, in a case where a Huffman codeword of a spectrum value is "1F1", the number of spectrum bits computed is 9 and the corresponding quantization value computed is "1". As illustrated in FIG. 11B, in a case where a Huffman codeword of a scale value is "7FFF3", the number of scale bits computed is 19 and the corresponding scale value computed is "+60". Notice that in an AAC system, the difference between the scale value of a previous frequency band (f−1) and the scale value of the current frequency band is subject to the Huffman encoding. Accordingly, the scale value of the current frequency band f is obtained by subtracting the computed difference (+60) from the scale value of the frequency band f−1. Next, the processing of the quantization error estimating section 46 is described. As described earlier, it is presumed that the larger ratio of the scale bits to the total number of bits of the spectrum bits and the scale bits results in the larger quantization error, and the smaller ratio of the scale bits to the total number of bits of the spectrum bits and the scale bits results in the smaller quantization error. Likewise, it is presumed that the smaller ratio of the spectrum bits to the total number of bits of the spectrum bits and the scale bits results in the larger quantization error, and the larger ratio of the spectrum bits to the total number of bits of the spectrum bits and the scale bits results in the smaller quantization error. Moreover, it is presumed that if the total number of the spectrum bits and the scale bits is constant, the quantization error can be estimated based on one of the numbers of the spectrum bits and scale bits.

Figure 12:
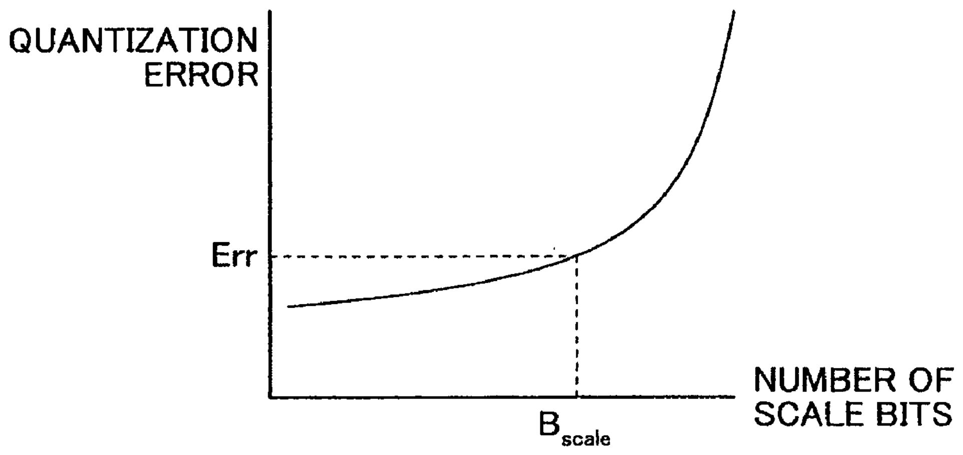
FIG. 12 is a diagram illustrating an example of a correspondence relationship between the number of scale bits and the quantization error.

If the total number of the spectrum bits and the scale bits is constant for each frequency band, the quantization error can be obtained based on the number of spectrum bits ($B_{scale}$) and an upward curve illustrated in FIG. 12. Alternatively, the upward curve may be replaced with a linear line. The decoding apparatus 4 can store data represented by a curved graph as illustrated in FIG. 12 as a table representing a correspondence relationship between the number of scale bits and the quantization error in the data storage section 49. The curve illustrated in FIG. 12 may be stored as an equation approximately representing the curve. An example of such an equation is given below. In the following equation, x represents the number of scale bits, y represents a quantization error, and a, b, and c each represent a constant number.

$$y=a*x^2+bx+c$$

Figure 13:
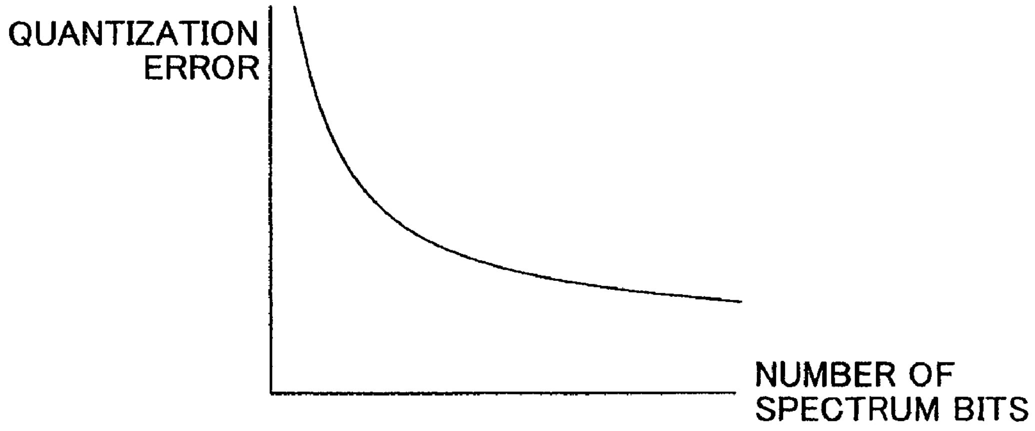
FIG. 13 is a diagram illustrating an example of a correspondence relationship between the number of spectrum bits and the quantization error.

Similarly, the quantization error can be obtained based on the number of spectrum bits ($B_{scale}$) and a downward curve illustrated in FIG. 13.

In a case where the quantization error is estimated based on the ratio of one of the number of scale bits and the number of spectrum bits to the total number of bits of the spectrum bits and the scale bits, the ratio of one of the number of scale bits and the number of spectrum bits may be computed first based on the following equations. The quantization error may be obtained based on a correspondence relationship similar to the correspondence relationship depicted in FIGS. 12 and 13.

Ratio=the number of scale bits/(the number of scale bits+the number of spectrum bits); or Ratio=the number of spectrum bits/(the number of scale bits+the number of spectrum bits)

Figure 14:
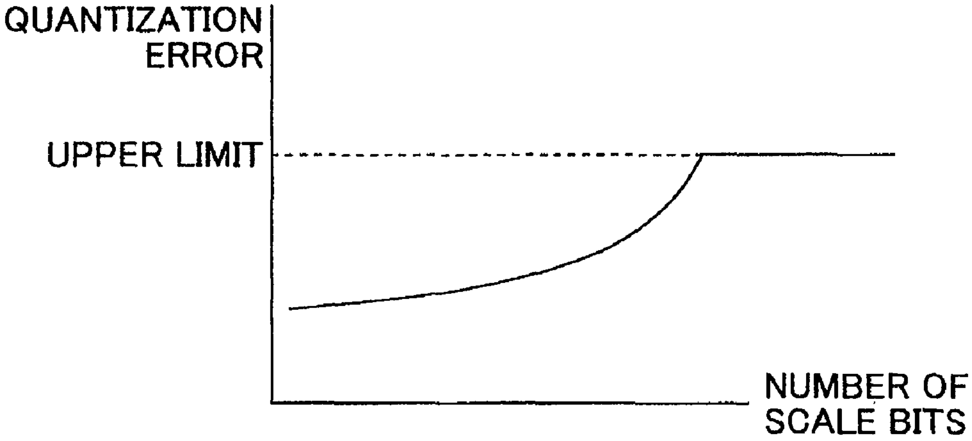
FIG. 14 is a diagram illustrating an example of a correspondence relationship between the number of scale bits and the quantization error.
Figure 15:
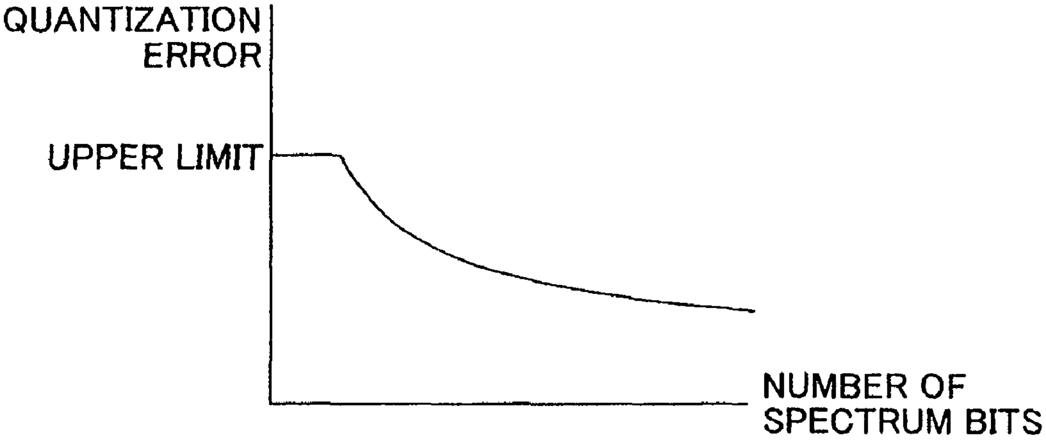
FIG. 15 is a diagram illustrating an example of a correspondence relationship between the number of spectrum bits and the quantization error.

In a case where the quantization error is estimated based on the number of scale bits, and the number of scale bits or the ratio of the number of scale bits to the total number of spectrum bits is equal to or more than a predetermined value, the obtained quantization error is clipped at a predetermined upper limit value. That is, the quantization error is obtained based on a curve having a shape depicted in FIG. 14. In a case where the number of spectrum bits is applied to the estimation of the quantization error, and the number of spectrum bits or the ratio of the number of spectrum bits to the total number of spectrum bits and scale bits is equal to or less than a certain value, the obtained quantization error is clipped at a predetermined upper limit value. That is, the quantization error is obtained based on a curve having a shape depicted in FIG. 15. Accordingly, such clip processing is carried out for preventing an estimation value of the quantization error from becoming excessively large.

Next, the processing of the correction amount computing section 47 is described. The correction amount computing section 47 computes a correction amount such that if the quantization error is large, the correction amount becomes large. However, the correction amount may have an upper limit value so as not to obtain an excessive correction amount. Further, the correction amount may also have a lower limit value.

Figure 16:
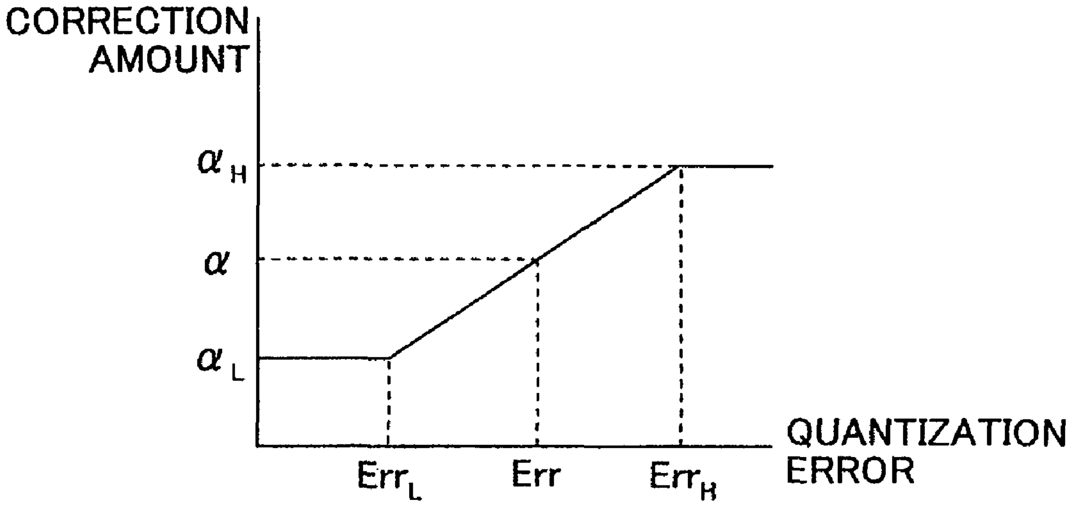
FIG. 16 is a diagram illustrating an example of a correspondence relationship between the quantization error and a correction amount.

FIG. 16 illustrates a correspondence relationship between the quantization error and the correction amount in a case where the correction amount has the upper and lower limit values. The correction amount computing section 47 computes a correction amount by assigning the obtained quantization error to a table or to equations of the correspondence relationship illustrated in FIG. 16. In FIG. 16, if the obtained quantization error in a certain frequency band is Err, a correction amount obtained is $\alpha$. In contrast, if the obtained quantization error in a certain frequency band is equal to or more than the upper limit value $Err_H$, a correction amount obtained is $\alpha H$, regardless of values of the obtained quantization error. Likewise, if the obtained quantization error in a certain frequency band is equal to or lower than the lower limit value $Err_L$, a correction amount obtained is $\alpha L$, regardless of values of the obtained quantization error. That is, in a case where the correspondence relationship illustrated in FIG. 16 is used for the estimation of the quantization error, a correction amount obtained may be expressed by the following equations. In the Equation 1, $\alpha H=1$, and $\alpha L=0$ may be assigned. This indicates that if the quantization error is equal to or lower than $Err_L$, the MDCT coefficient is not corrected.

$$\text{Correction Amount} = \begin{cases} \alpha_H & (Err \geq Err_H) \\ \alpha_L & (Err \leq Err_L) \\ \alpha & (\text{Other than those above}) \end{cases} \quad (1)$$

Next, the processing of the spectrum correcting section 48 is described. If a pre-correction MDCT coefficient in a certain frequency f is MDCT(f), a correction amount is $\alpha$, and a post-correction MDCT coefficient is MDCT'(f), the spectrum correcting section 48 computes the MDCT'(f) that is the post-correction MDCT coefficient based on the following equation.

$$MDCT'(f)=(1-\alpha)MDCT(f)$$

For example, if $\alpha=0$ (i.e., the correction amount is 0), a value of the pre-correction MDCT coefficient equals a value of the post-correction MDCT coefficient. The aforementioned equation is applied in a case where the MDCT coefficient is corrected in a certain frequency; however, the correction amount of the MDCT coefficient may be interpolated between adjacent frequency bands by applying the following equations.

$$MDCT'(f)=k\cdot MDCT(f-1)+(1-k)(1-\alpha)MDCT(f)\quad(0\leq k\leq 1)$$

As described so far, in the embodiment, the quantization error is estimated based on the number of spectrum bits or the number of scale bits and the MDCT coefficient is corrected based on the estimated quantization error. Accordingly, the quantization error generated in the decoding apparatus may be lowered. Accordingly, the sound due to clip that is generated when a tone signal or sweep signal having large amplitude is input to the decoding apparatus may be suppressed.

Second Embodiment

Figure 17:
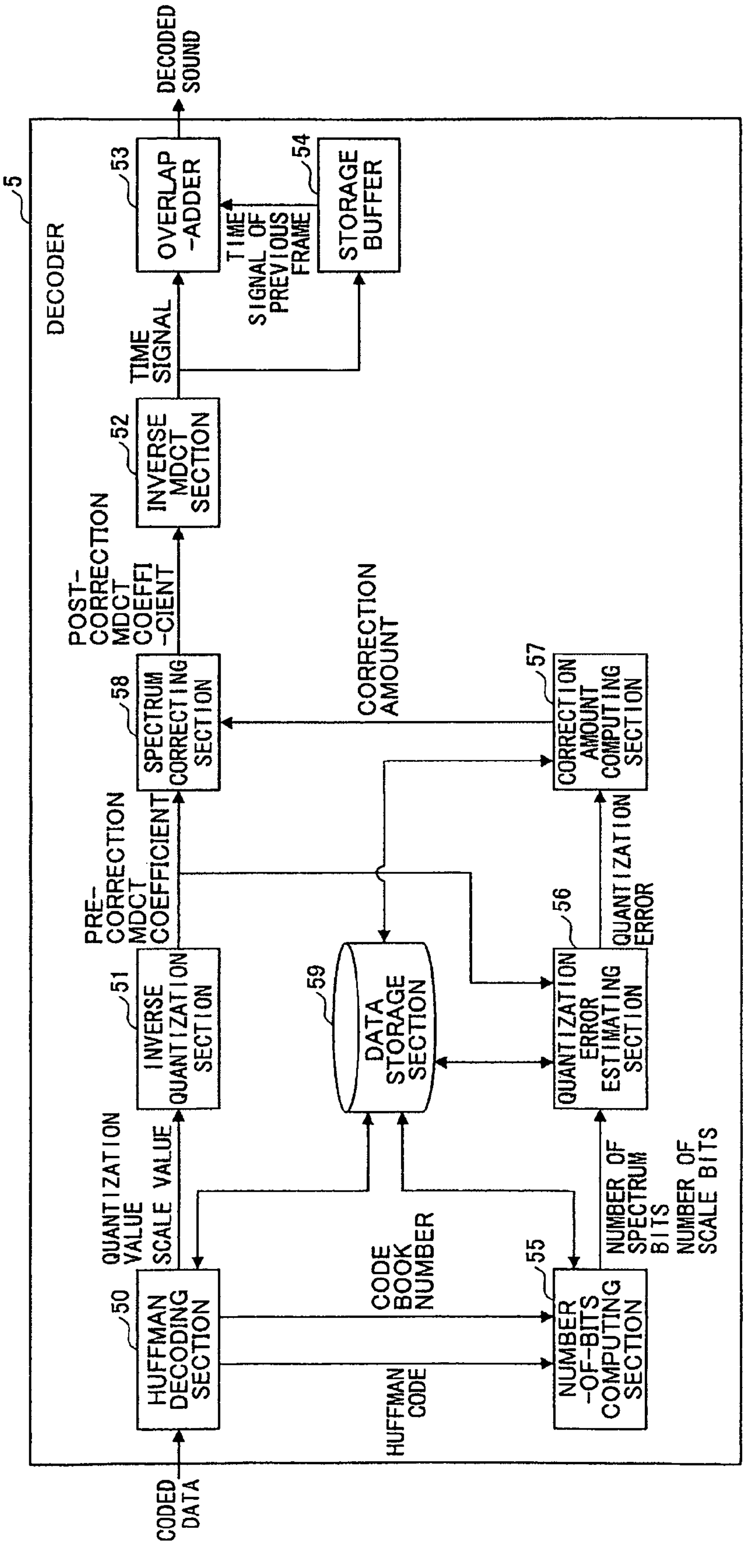
FIG. 17 is a diagram illustrating a configuration of a decoding apparatus according to the second embodiment.

FIG. 17 illustrates a configuration of a decoding apparatus 5 according to a second embodiment. The decoding apparatus 5 according to the second embodiment includes functional components similar to those of the decoding apparatus 4 according to the first embodiment. Notice that processing performed by a quantization error estimating section 56 of the second embodiment differs from the processing performed by the quantization error estimating section 46 of the first embodiment. As illustrated in FIG. 17, in the decoding apparatus 5, a pre-correction MDCT coefficient computed by an inverse quantization section 51 is supplied to the quantization error estimating section 56. This portion of configuration also differs from the decoding apparatus 4 according to the first embodiment. Other functional components of the decoding apparatus 5 according to the second embodiment are the same as those of the decoding apparatus 4 according to the first embodiment.

In general, it is presumed that a range of a spectrum value to be quantized is large when the absolute value of an inverse quantization value of a pre-correction MDCT coefficient is large, as compared to when the absolute value is small, and as a result, the quantization error may also become large. Accordingly, if the number of spectrum bits or the number of scale bits is the same between when the absolute value of the inverse quantization value is large and when the absolute value of the inverse quantization value is small, the quantization error is large when the absolute value of the inverse quantization value is large. That is, an extent to which the number of scale bits or the number of spectrum bits affects the quantization error varies based on a magnitude of the inverse quantization value.

Figure 18:
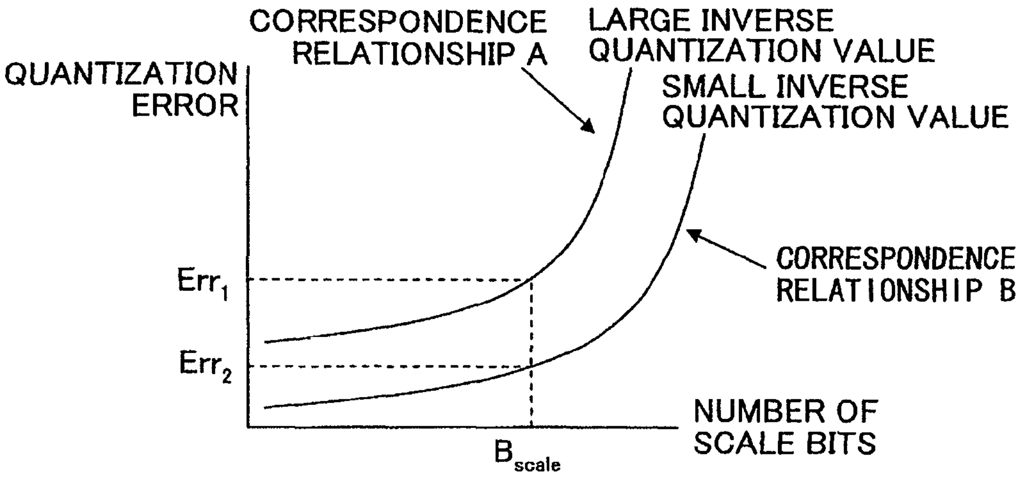
FIG. 18 is a diagram illustrating an example in a case where a plurality of correspondence relationships is provided between the number of scale bits and the quantization error.

The second embodiment is devised based on these factors. That is, in a case where the quantization error is estimated based on the number of scale bits, plural correspondence relationships between the number of scale bits and the quantization error are prepared as illustrated in FIG. 18, and a data storage section 59 stores the plural correspondence relationships between the number of scale bits and the quantization error. Alternatively, the data storage section 59 may store equations representing the correspondence relationships between the number of scale bits and the quantization error. The quantization error estimating section 56 selects one of the correspondence relationships based on the magnitude of the inverse quantization value to compute the quantization error based on the obtained number of scale bits. Specifically, as illustrated in FIG. 18, the quantization error estimating section 56 computes the quantization error based on a correspondence relationship A if the magnitude of the inverse quantization value is equal to or more than a predetermined threshold, whereas the quantization error estimating section 56 computes the quantization error based on a correspondence relationship B if the magnitude of the inverse quantization value is lower than a predetermined threshold.

As illustrated in FIG. 18, if the number of scale bits in a certain frequency band is $B_{scale}$, the quantization error $Err_1$ is obtained based on the correspondence relationship A, whereas the quantization error $Err_2$ is obtained based on the correspondence relationship B.

Figure 19:
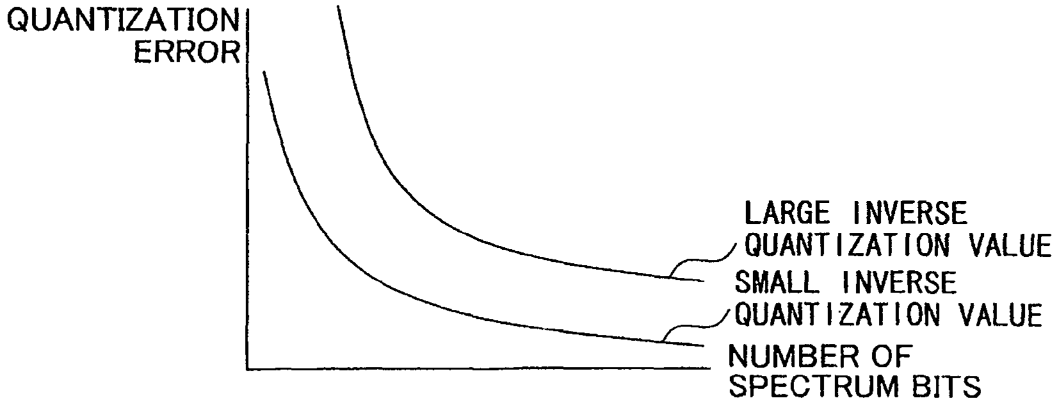
FIG. 19 is a diagram illustrating an example in a case where a plurality of correspondence relationships is provided between the number of spectrum bits and the quantization error.

In a case where the quantization error is estimated based on the ratio of the number of scale bits to a total number of bits, correspondence relationships similar to the plural correspondence relationships illustrated in FIG. 18 may also be employed. Moreover, in a case where the quantization error is estimated based on the number of spectrum bits, plural correspondence relationships illustrated in FIG. 19 may be employed. Similarly, the plural correspondence relationships illustrated in FIG. 19 may also be employed in a case where the quantization error is estimated based on the ratio of the number of scale bits to the total number of bits.

Third Embodiment

Figure 20:
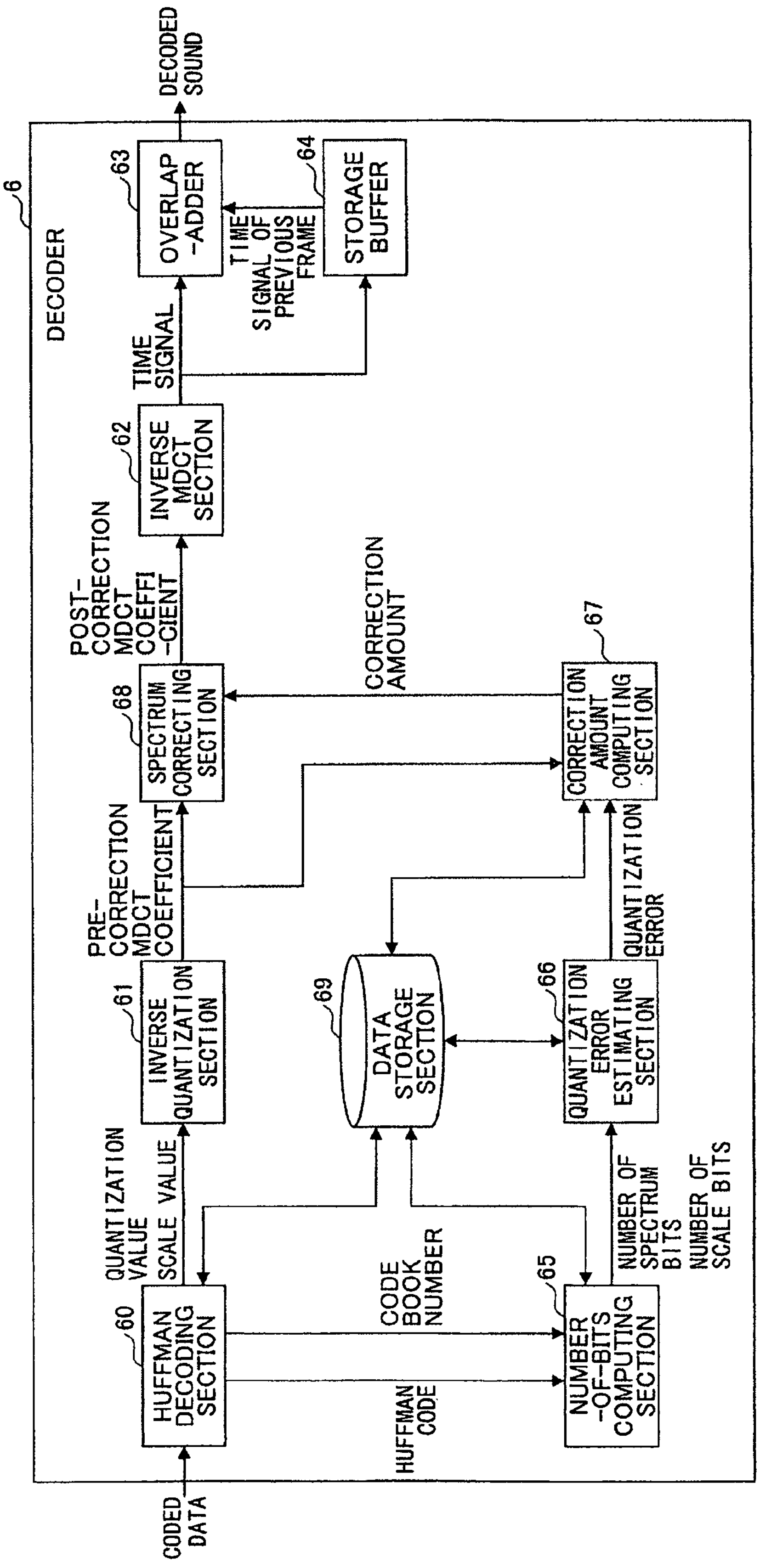
FIG. 20 is a diagram illustrating a configuration of a decoding apparatus according to the third embodiment.

A third embodiment is devised based on a view similar to that of the second embodiment. FIG. 20 illustrates a configuration of a decoding apparatus 6 according to the third embodiment. The configuration of the second embodiment illustrated in FIG. 20 differs from the configuration of the first embodiment in that the inverse quantization value of the pre-correction MDCT coefficient is supplied to a correction amount computing section 67. In addition, processing of the correction amount computing section 67 also differs from the processing of the correction amount computing section 57 of the first embodiment. Other configuration of the third embodiment is the same as that of the first embodiment.

Figure 21:
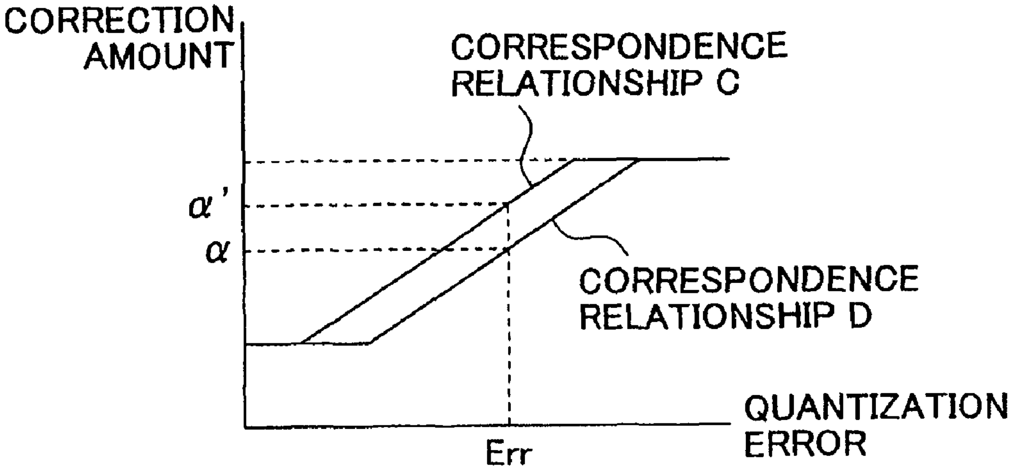
FIG. 21 is a diagram illustrating an example in a case where a plurality of correspondence relationships is provided between the quantization error and the correction amount.

As illustrated in FIG. 21, the decoding apparatus 6 according to the third embodiment stores plural correspondence relationships between a quantization error and a correction amount, and the correction amount computing section 67 selects one of the correspondence relationships based on the magnitude of the inverse quantization value. For example, if the inverse quantization value is below a predetermined threshold, the correction amount computing section 67 selects a correspondence relationship D. In such a case, the correction amount computing section 67 computes a correction amount $\alpha$ when the quantization error is Err. Conversely, if the inverse quantization value is equal to or more than the predetermined threshold, the correction amount computing section 67 selects a correspondence relationship C. In such a case, the correction amount computing section 67 computes a correction amount $\alpha'$ when the quantization error is Err.

Fourth Embodiment

Figure 22:
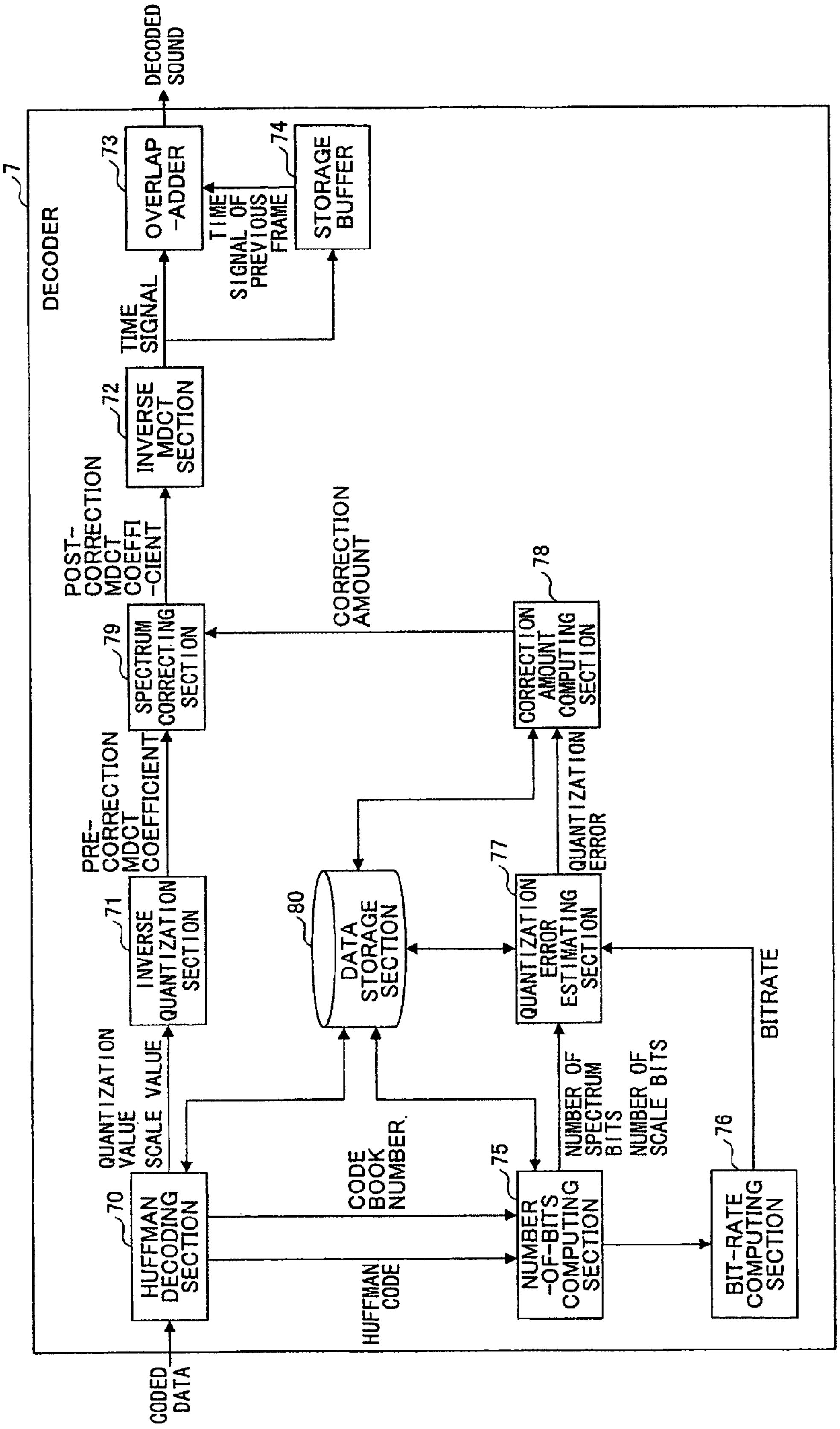
FIG. 22 is a diagram illustrating a configuration of a decoding apparatus according to the fourth embodiment.

Next, a fourth embodiment is described. FIG. 22 illustrates a configuration of a decoding apparatus 7 according to a fourth embodiment. The decoding apparatus 7 of the fourth embodiment differs from the decoding apparatus 4 of the first embodiment in that the decoding apparatus 7 of the fourth embodiment includes a bit-rate computing section 76, and processing performed by a quantization error estimating section 77 of the fourth embodiment differs from the processing performed by the quantization error estimating section 46 of the first embodiment. Other functional components of the decoding apparatus 7 according to the fourth embodiment are the same as those of the decoding apparatus 4 according to the first embodiment.

In general, it is assumed that a range of spectrum value to be quantized is large when a bit-rate in encoding is high as compared to when the bit-rate in encoding is low, and as a result, the quantization error may also be large. That is, a degree by which the number of scale bits or the number of spectrum bits affects the quantization error varies based on the bit-rate of the coded data. Notice that the bit-rate of the coded data is the number of bits that are consumed in converting an audio signal into the coded data per unit of time (e.g., per second).

Figure 23:
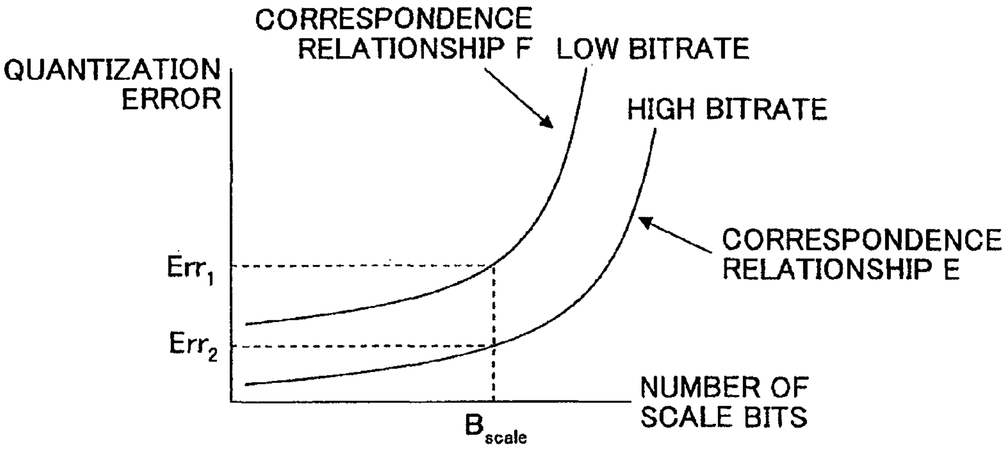
FIG. 23 is a diagram illustrating an example in a case where a plurality of correspondence relationships is provided between the number of scale bits and the quantization error.

The fourth embodiment incorporates such a bit-rate factor. Accordingly, in a case where the quantization error is estimated based on the number of spectrum bits, plural correspondence relationships between the number of scale bits and the quantization error are prepared as illustrated in FIG. 23, and a data storage section 80 of the decoding apparatus 7 stores such plural correspondence relationships between the number of scale bits and the quantization error. Alternatively, the data storage section 80 may store equations representing the correspondence relationships between the number of scale bits and the quantization error.

In the configuration illustrated in FIG. 22, the bit-rate computing section 76 computes the bit-rate of the coded data and the obtained bit-rate is supplied to the quantization error estimating section 77. Notice that the bit-rate is computed based on the number of bits of the coded data or obtained based on information on a frame header. The quantization error estimating section 77 selects one of the correspondence relationships corresponding to the bit-rate supplied from the number-of-bits computing section 76, and computes a quantization error based on the selected correspondence relationship corresponding to the number of scale bits. That is, in a case where the bit-rate supplied is equal to or more than a predetermined threshold, the quantization error estimating section 77 selects a correspondence relationship E illustrated in FIG. 23. In contrast, in a case where the bit-rate supplied is lower than a predetermined threshold, the quantization error estimating section 77 selects a correspondence relationship F illustrated in FIG. 23.

As illustrated in FIG. 23, if the number of scale bits in a certain frequency band is $B_{scale}$, the quantization error $Err_1$ is obtained based on the correspondence relationship F, whereas the quantization error $Err_2$ is obtained based on the correspondence relationship E.

Figure 24:
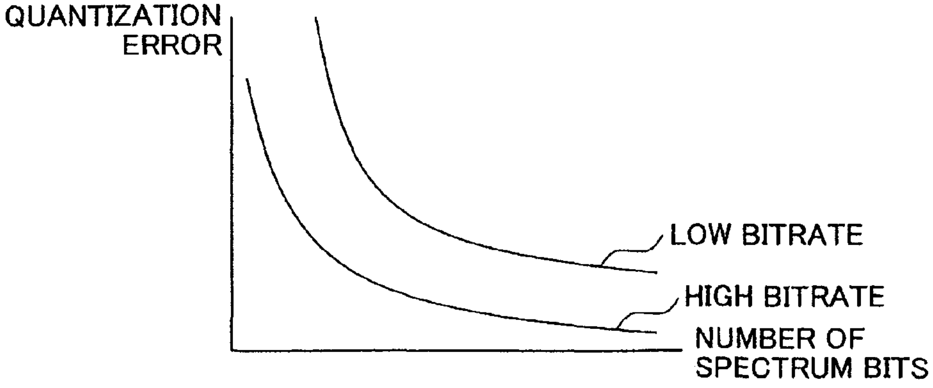
FIG. 24 is a diagram illustrating an example in a case where a plurality of correspondence relationships is provided between the number of spectrum bits and the quantization error.

In a case where the quantization error is estimated based on the ratio of the number of scale bits to a total number of bits, correspondence relationships similar to the plural correspondence relationships illustrated in FIG. 23 may also be employed. Moreover, in a case where the quantization error is estimated based on the number of spectrum bits, plural correspondence relationships illustrated in FIG. 24 may be employed. Similarly, the plural correspondence relationships illustrated in FIG. 24 may also be employed in a case where the quantization error is estimated based on the ratio of the number of spectrum bits to a total number of bits.

Fifth Embodiment

Figure 25:
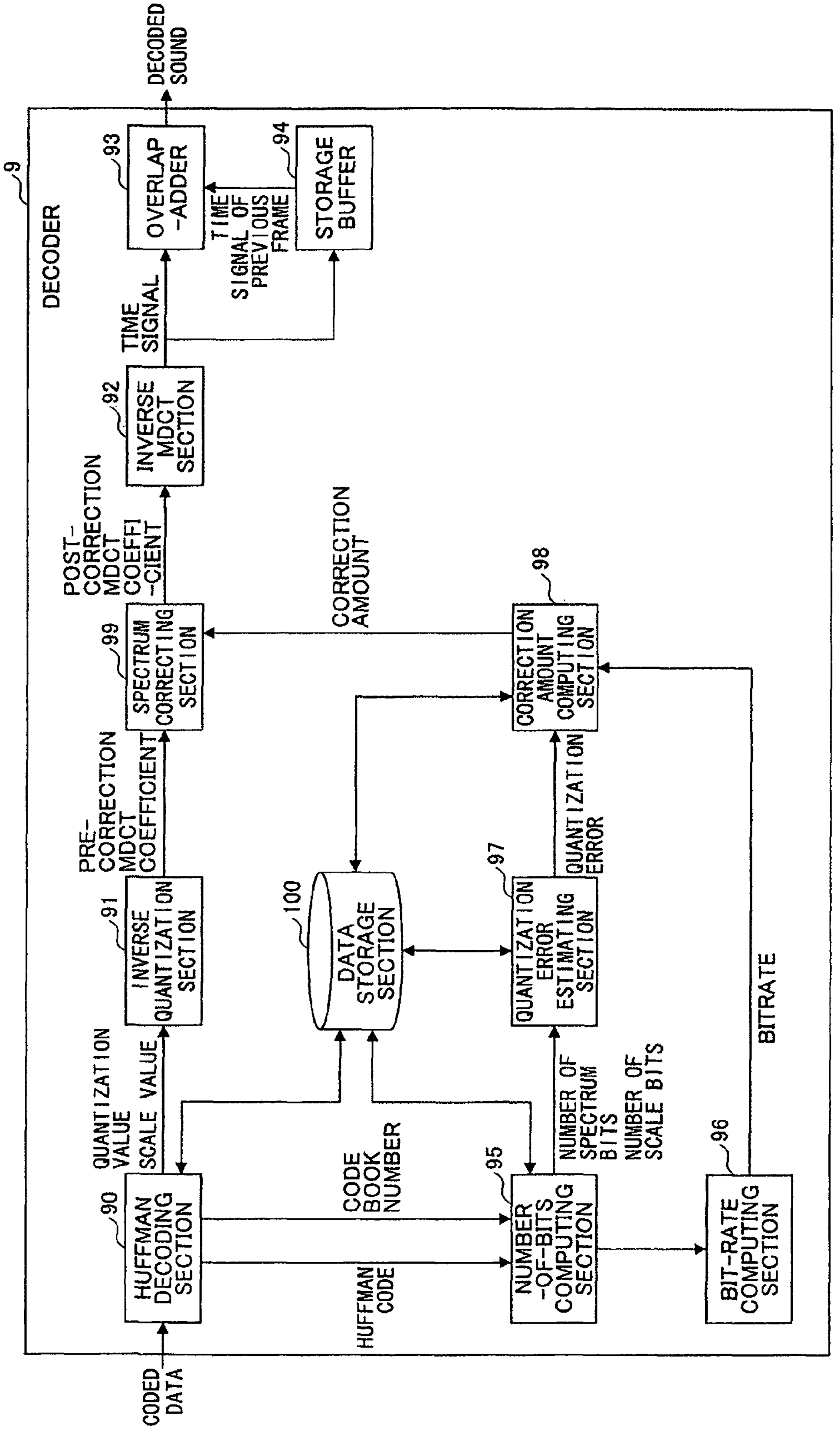
FIG. 25 is a diagram illustrating a configuration of a decoding apparatus according to the fifth embodiment.

A fifth embodiment is devised based on a view similar to that of the fourth embodiment. FIG. 25 illustrates a configuration of a decoding apparatus 9 according to the fifth embodiment. The configuration illustrated in FIG. 25 differs from the fourth embodiment in that a bit-rate computing section 96 supplies a bit-rate of the coded data to a correction amount computing section 98, and the correction amount computing section 98 selects one of correspondence relationships instead of a quantization error estimating section 97.

Figure 26:
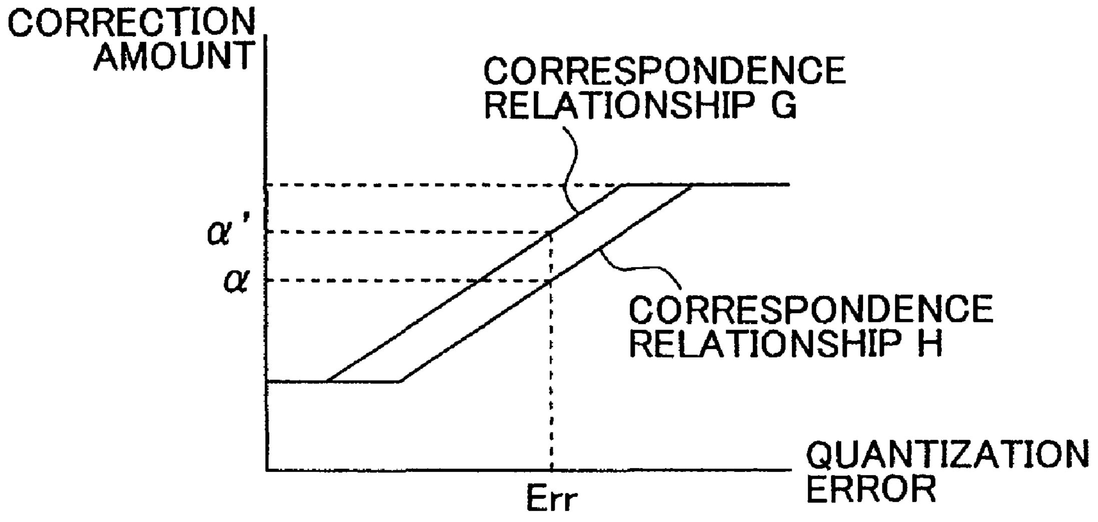
FIG. 26 is a diagram illustrating an example in a case where a plurality of correspondence relationships is provided between the quantization error and the correction amount.

As illustrated in FIG. 26, the decoding apparatus 6 according to the fifth embodiment stores plural correspondence relationships between a quantization error and a correction amount, and the correction amount computing section 98 selects one of the correspondence relationships based on the supplied bit-rate. For example, if the supplied bit-rate is equal to or higher than a predetermined threshold, the correction amount computing section 98 selects a correspondence relationship H. In such a case, the correction amount computing section 98 computes a correction amount a when the quantization error is Err. Conversely, if the supplied bit-rate is lower than the predetermined threshold, the correction amount computing section 98 selects a correspondence relationship G. In such a case, the correction amount computing section 98 computes a correction amount α' when the quantization error is Err.

Sixth Embodiment

Figure 27:
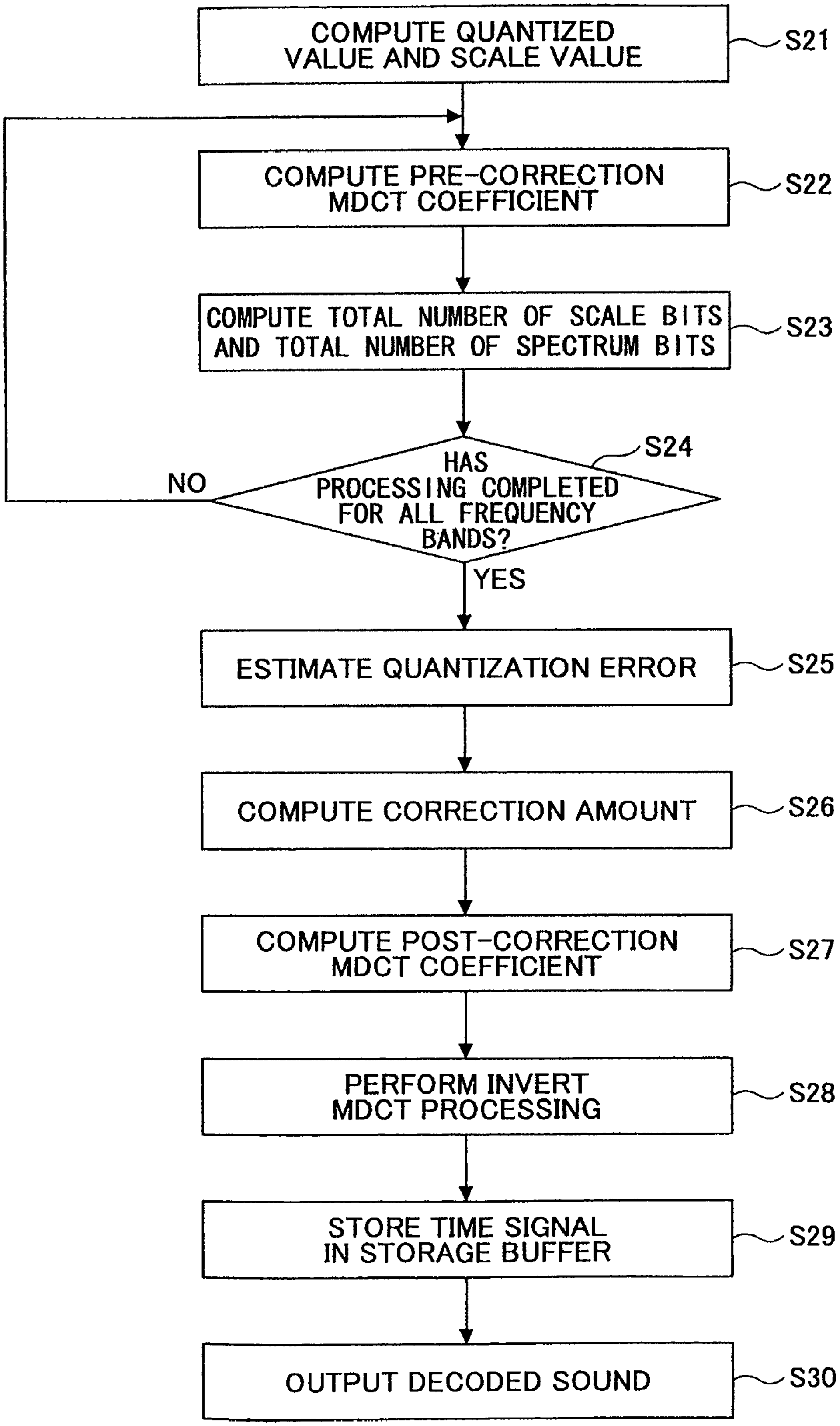
FIG. 27 is a flowchart for explaining operation of the decoding apparatus according to the sixth embodiment.

Next, a sixth embodiment is described. An entire configuration of a decoding apparatus according to the sixth embodiment is the same as that of the first embodiment illustrated in FIG. 9. Accordingly, the sixth embodiment is described with reference to FIG. 9. The sixth embodiment differs from the first embodiment in processing operation. Operation of a decoding apparatus 4 according to the sixth embodiment is described below, by referring to a flowchart of FIG. 27.

The decoding apparatus 4 receives coded data of a current frame. A Huffman decoding section 40 Huffman-decodes the received coded data to compute a spectrum value (quantization value) and a scale value of a MDCT coefficient for each frequency band (Step 21). The Huffman decoding section 40 inputs the quantization value and scale value in one frequency band into the inverse quantization section 41, and the inverse quantization section 41 computes a pre-correction MDCT coefficient based on the quantization value and scale value (Step 22). In the mean time, the Huffman decoding section 40 inputs a Huffman codeword corresponding to the quantization value and a Huffman codeword corresponding to the scale value in the aforementioned frequency band, and also inputs respective codebook numbers, to which the respective Huffman codewords correspond, into a number-of-bits computing section 45. Then, the number-of-bits computing section 45 computes the number of spectrum bits and the number of scale bits. Further, the number-of-bits computing section 45 computes a total number of spectrum bits by adding a total number of spectrum bits previously obtained with the number of spectrum bits currently obtained and also computes a total number of scale bits by adding a total number of scale bits previously obtained with the number of scale bits currently obtained (Step 23).

The decoding apparatus 4 reiterates Steps 22 and 23 such that the number-of-bits computing section 45 computes the total number of spectrum bits for an all the frequency bands and the total number of scale bits for all the frequency bands of the current frame. In addition, the inverse quantization section 41 computes pre-correction MDCT coefficients for all the frequency bands.

The number-of-bits computing section 45 inputs the total number of computed spectrum bits and the total number of computed scale bits into the quantization error estimating section 46, and the quantization error estimating section 46 computes a quantization error for all the frequency bands based on one of, or both of the input total number of spectrum bits and the input total number of scale bits (Step 25). Here, the quantization error may be obtained based on a correspondence relationship similar to the correspondence relationship described in the first embodiment.

The quantization error computed by the quantization error estimating section 46 is input to the correction amount computing section 47. The correction amount computing section computes a correction amount corresponding to the pre-correction MDCT coefficient for all the frequency bands based on the computed quantization error (Step 26), and supplies the computed correction amount into a spectrum correcting section 48. A process for computing the correction amount is the same as that of the first embodiment.

The spectrum correcting section 48 corrects the pre-correction MDCT coefficient input from the inverse quantization section 41 based on the computed correction amount obtained by the correction amount computing section 47 and computes the post-correction MDCT coefficient (Step 27). The spectrum correcting section 48 according to the sixth embodiment uniformly corrects the pre-correction MDCT coefficient with the same correction amount for all the frequency bands, and inputs the corrected MDCT coefficient for all the frequency bands to an inverse MDCT section 42.

The inverse MDCT section 42 performs inverse MDCT processing on the post-correction MDCT coefficients for all the frequency bands of the current frame to output a time signal of the current frame (Step 28). The time signals output from the MDCT section 42 are input to an overlap-adder 43 and a storage buffer 44 (Step 29).

The overlap-adder 43 adds the time signal of the current frame supplied from the inverse MDCT section 42 and a time signal of the previous frame stored in the storage buffer 44, thereby outputting decoded sound (Step 30).

In the sixth embodiment, a correction amount for all the frequency bands of the frame is computed and the MDCT coefficient for all the frequency bands is corrected based on the computed correction amount. Alternatively, a correction amount is computed based on the total number of spectrum bits for several frequency bands, and thereafter, processing to uniformly correct the MDCT coefficient in the several frequency bands is performed until the application of correction processing is completed for all the frequency bands.

Alternatively, the processing of the sixth embodiment may be combined with one of the processing described in the second to fifth embodiments.

Figure 28:
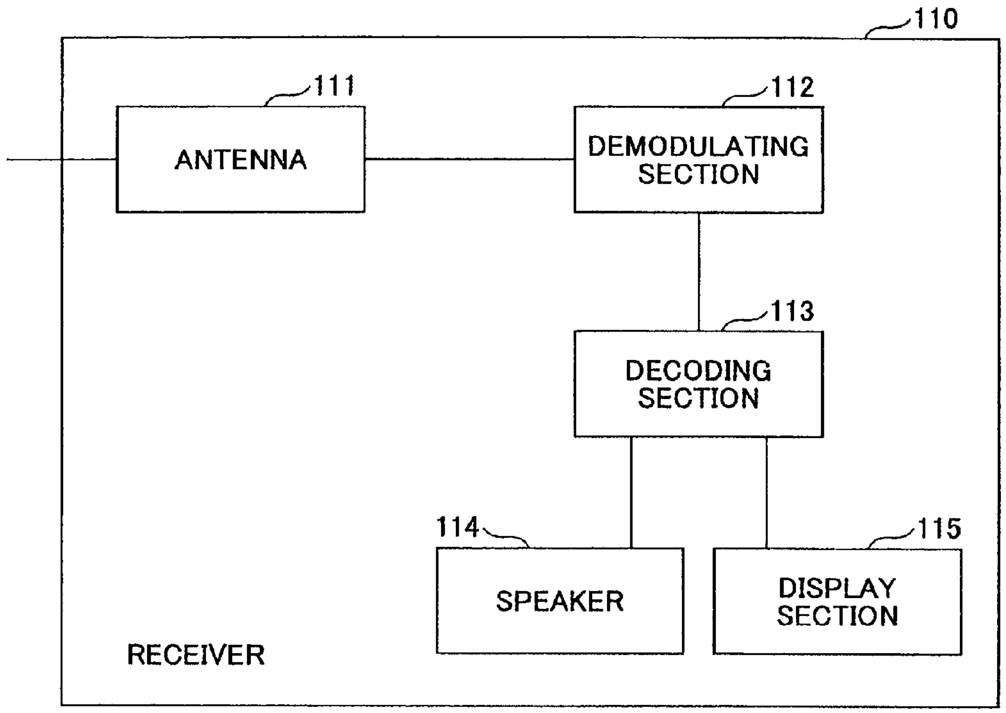
FIG. 28 is a diagram illustrating an example of a receiver including a decoding apparatus according to the embodiments.

The decoding apparatuses according to the first to the sixth embodiments may each be applied to various apparatuses such as broadcasting receivers, communication devices, and audio reproducing devices. FIG. 28 illustrates one example of a configuration of a receiver 110 for receiving terrestrial digital TV broadcasting. The receiver 110 includes an antenna 111 configured to receive airwaves, a demodulating section 112 configured to demodulate an OFDM modulated signal, a decoding section 113 configured to decode coded data obtained by the demodulating section 112, a speaker 114 configured to output a sound, and a display section 115 configured to output images. The decoding section includes an image decoding apparatus and an audio decoding apparatus, and the audio decoding apparatus includes a function of the decoding apparatus described in the aforementioned embodiments.

Figure 29:
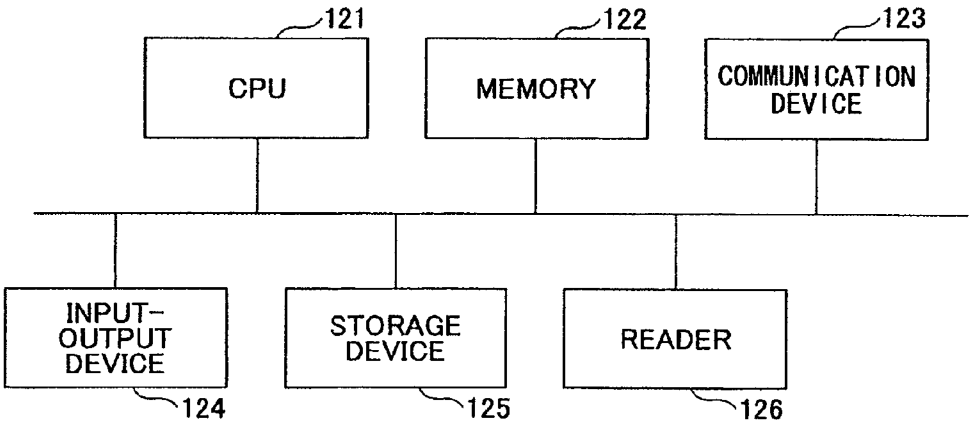
FIG. 29 is a diagram illustrating one example of a configuration a computer system.

Each of the functional components of the decoding apparatuses according to the first to sixth embodiments may either be realized in hardware or realized by causing a computer system to execute computer programs. FIG. 29 illustrates one example of a configuration of such a computer system 120. As illustrated in FIG. 29, the computer system 120 includes a CPU 120, a memory 122, a communication device 123, an input-output device 124 including an output section configured to output sound, a storage device 125 such as a hard-disk drive, and a reader 126 configured to read a recording medium such as a CD-ROM.

Computer programs that execute decoding processing described in the embodiments are read by the reader 126 to be installed in the computer system 120. Alternatively, the computer programs may be downloaded from a server over networks. For example, the coded data stored in the storage device 125 are read, the read coded data are decoded, and the decoded data are output as a decoded sound by causing the computer system 120 to execute the computer programs. Alternatively, the coded data may be received from the communication device over networks, the received coded data are decoded, and the decoded data are output as the decoded sound.

In the aforementioned decoding apparatus, the number-of-bits computing unit may be configured to compute a ratio of one of the number of spectrum bits and the number of scale bits of the coded data to a total number of bits of the spectrum bits and the scale bits, and the quantization error estimating unit may be configured to estimate the correction amount based on the computed ratio of the one of the number of spectrum bits and the number of scale bits to the total number of bits of the spectrum bits and the scale bits.

Further, the quantization error estimating unit may be configured to estimate the quantization error based on a predetermined correspondence relationship between one of the number of scale bits and the number of spectrum bits and a corresponding quantization error. Moreover, the quantization error estimating unit may be configured to obtain the frequency domain audio signal data that have been obtained by the frequency domain data obtaining unit, select one of a plurality of predetermined correspondence relationships between one of the number of scale bits and the number of spectrum bits and a corresponding quantization error based on a magnitude of a value of the frequency domain audio signal data, and estimate the quantization error based on the selected one of the plurality of predetermined correspondence relationships between the one of the number of scale bits and the number of spectrum bits and the corresponding quantization error.

Still further, in the aforementioned decoding apparatus, the correcting unit may be configured to obtain the frequency domain audio signal data that have been obtained by the frequency domain data obtaining unit, select one of a plurality of predetermined correspondence relationships between the estimated quantization error and a corresponding correction amount based on a magnitude of a value of the frequency domain audio signal data based on a magnitude of a value of the frequency domain audio signal data, and compute the correction amount based on the selected one of the plurality of predetermined correspondence relationships between the estimated quantization error and the corresponding correction amount. With the aforementioned configuration, the correcting unit may compute an adequate correction amount based on a magnitude of a value of the frequency domain audio signal data.

In addition, the decoding apparatus may further include a bit-rate-computing unit configured to compute a bit-rate of the coded data. In such a case, the quantization error estimating unit may be configured to select one of a plurality of predetermined correspondence relationships between one of the number of scale bits and the number of spectrum bits and a corresponding quantization error based on the computed bit-rate of the coded data, and estimate the quantization error based on the selected one of the plurality of predetermined correspondence relationships between the one of the number of scale bits and the number of spectrum bits and the corresponding quantization error. Further, in this case, the correction unit may be configured to select one of a plurality of predetermined correspondence relationships between the estimated quantization error and a corresponding correction amount based on the computed bit-rate, and compute the correction amount based on the selected one of the plurality of predetermined correspondence relationships between the estimated quantization error and the corresponding correction amount. In this manner, the correction unit may compute an adequate correction amount.

According to any one of the aforementioned embodiments, the quantization error may be computed based on the number of scale bits and the number of spectrum bits obtained from the coded data, and the inverse quantization values are corrected based on a correction amount computed based on the computed quantization error. Accordingly, the abnormal sound generated due to the quantization error may be reduced when the decoding apparatus decodes the coded data to output the audio signal.

Although the embodiments are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contribute by the inventor to furthering the art, and are to be construed as being without limitation to such specifically recited examples and conditions, nor does the organization of such examples in the specification related to a showing of the superiority and inferiority of the invention. Although the embodiments have been described in detail, it should be understood that the various changes, substitutions, and alterations could be made hereto without departing from the spirit and scope of the invention.

What is claimed is:

1. A decoding apparatus for decoding coded data obtained by encoding a scale value and a spectrum value of frequency domain audio signal data to output an audio signal, comprising:

a frequency domain data obtaining unit configured to decode and inversely quantize the coded data to obtain the frequency domain audio signal data;

a number-of-bits computing unit configured to compute from the coded data one of the number of scale bits composed of the number of bits corresponding to the scale value of the coded data and the number of spectrum bits composed of the number of bits corresponding to the spectrum value of the coded data;

a quantization error estimating unit configured to estimate a quantization error of the frequency domain audio signal data based on one of the number of scale bits and the number of spectrum bits;

a correcting unit configured to compute a correction amount based on the estimated quantization error and correct the frequency domain audio signal data obtained by the frequency domain data obtaining unit based on the computed correction amount; and a converting unit configured to convert the corrected frequency domain audio signal data corrected by the correcting unit into the audio signal.

2. The decoding apparatus as claimed in claim 1, wherein the number-of-bits computing unit computes a ratio of one of the number of spectrum bits and the number of scale bits of the coded data to a total number of bits of the spectrum bits and the scale bits of the coded data, and wherein the quantization error estimating unit estimates the correction amount based on the computed ratio of the one of the number of spectrum bits and the number of scale bits of the coded data to the total number of bits of the spectrum bits and the scale bits of the coded data.

3. The decoding apparatus as claimed in claim 1, wherein the quantization error estimating unit estimates the quantization error based on a predetermined correspondence relationship between one of the number of scale bits and the number of spectrum bits and a corresponding quantization error.

4. The decoding apparatus as claimed in claim 1, wherein the quantization error estimating unit obtains the frequency domain audio signal data that have been obtained by the frequency domain data obtaining unit, selects one of a plurality of predetermined correspondence relationships between one of the number of scale bits and the number of spectrum bits and a corresponding quantization error based on a magnitude of a value of the frequency domain audio signal data, and estimates the quantization error based on the selected one of the plurality of predetermined correspondence relationships between the one of the number of scale bits and the number of spectrum bits and the corresponding quantization error.

5. The decoding apparatus as claimed in claim 1, wherein the correcting unit obtains the frequency domain audio signal data that have been obtained by the frequency domain data obtaining unit, selects one of a plurality of predetermined correspondence relationships between the estimated quantization error and a corresponding correction amount based on a magnitude of a value of the frequency domain audio signal data, and computes the correction amount based on the selected one of the plurality of predetermined correspondence relationships between the estimated quantization error and the corresponding correction amount.

6. The decoding apparatus as claimed in claim 1, further comprising:

a bit-rate computing unit configured to compute a bit-rate of the coded data, wherein the quantization error estimating unit selects one of a plurality of predetermined correspondence relationships between one of the number of scale bits and the number of spectrum bits and a corresponding quantization error based on the computed bit-rate of the coded data, and estimates the quantization error based on the selected one of the plurality of predetermined correspondence relationships between the one of the number of scale bits and the number of spectrum bits and the corresponding quantization error.

7. The decoding apparatus as claimed in claim 1, further comprising:

a bit-rate-computing unit configured to compute a bit-rate of the coded data, wherein the correction unit selects one of a plurality of predetermined correspondence relationships between the estimated quantization error and a corresponding correction amount based on the computed bit-rate of the coded data, and computes the correction amount based on the selected one of the plurality of predetermined correspondence relationships between the estimated quantization error and the corresponding correction amount.

8. The decoding apparatus as claimed in claim 1, wherein the number-of-bits computing unit computes one of a total number of scale bits for a plurality of frequency bands and a total number of spectrum bits for a plurality of frequency bands as one of the number of scale bits and the number of spectrum bits, and wherein the correcting unit corrects the frequency domain audio signal data for each of the plurality of frequency bands based on the computed correction amount.

9. A method for decoding coded data performed by a decoding apparatus to decode the coded data obtained by encoding a scale value and a spectrum value of frequency domain audio signal data to output an audio signal, the method comprising:

computing from the coded data one of the number of scale bits composed of the number of bits corresponding to the scale value of the coded data and the number of spectrum bits composed of the number of bits corresponding to the spectrum value of the coded data;

estimating a quantization error of correcting the frequency domain audio signal data based on one of the number of scale bits and the number of spectrum bits;

computing a correction amount based on the estimated quantization error;

correcting the frequency domain audio signal data obtained by the frequency domain data obtaining unit based on the computed correction amount; and converting the corrected frequency domain audio signal data corrected by the correcting step into the audio signal.

10. The method as claimed in claim 9, wherein the number-of-bits computing step includes computing a ratio of one of the number of spectrum bits and the number of scale bits of the coded data to a total number of bits of the spectrum bits and the scale bits of the coded data, and wherein the quantization error estimating step includes estimating the correction amount based on the computed ratio of the one of the number of spectrum bits and the number of scale bits of the coded data to the total number of bits of the spectrum bits and the scale bits of the coded data.

11. The method as claimed in claim 9, wherein the quantization error estimating step includes estimating the quantization error based on a predetermined correspondence relationship between one of the number of scale bits and the number of spectrum bits and a corresponding quantization error.

12. The method as claimed in claim 9, wherein the quantization error estimating step includes obtaining the frequency domain audio signal data by decoding and inversely quantizing the coded data, selecting one of a plurality of predetermined correspondence relationships between one of the number of scale bits and the number of spectrum bits and a corresponding quantization error based on a magnitude of a value of the frequency domain audio signal data, and estimating the quantization error based on the selected one of the plurality of predetermined correspondence relationships between the one of the number of scale bits and the number of spectrum bits and the corresponding quantization error.

13. The method as claimed in claim 9, wherein the correction amount computing step includes obtaining the frequency domain audio signal data by decoding and inversely quantizing the coded data, selecting one of a plurality of predetermined correspondence relationships between the estimated quantization error and a corresponding correction amount based on a magnitude of a value of the frequency domain audio signal data, and computing the correction amount based on the selected one of the plurality of predetermined correspondence relationships between the estimated quantization error and the corresponding correction amount.

14. The method as claimed in claim 9, further comprising: computing a bit-rate of the coded data, wherein the quantization error estimating step includes selecting one of a plurality of predetermined correspondence relationships between one of the number of scale bits and the number of spectrum bits and a corresponding quantization error based on the bit-rate of the coded data based on the computed bit-rate of the coded data, and estimating the quantization error based on the selected one of the plurality of predetermined correspondence relationships between the one of the number of scale bits and the number of spectrum bits and the corresponding quantization error.

15. The method as claimed in claim 9, further comprising: computing a bit-rate of the coded data, wherein the correction step includes selecting one of a plurality of predetermined correspondence relationships between the estimated quantization error and a corresponding correction amount based on the computed bit-rate of the coded data, and computing the correction amount based on the selected one of the plurality of predetermined correspondence relationships between the estimated quantization error and the corresponding correction amount.

16. The method as claimed in claim 9, wherein the number-of-bits computing step includes computing one of a total number of scale bits for a plurality of frequency bands and a total number of spectrum bits for a plurality of frequency bands as one of the number of scale bits and the number of spectrum bits, and wherein the correcting step includes correcting the frequency domain audio signal data for each of the plurality of frequency bands based on the computed correction amount.

17. A non-transitory computer-readable recording medium having instructions causing a computer to function as a decoding apparatus to decode coded data obtained by encoding a scale value and a spectrum value of frequency domain audio signal data to output an audio signal, the instructions comprising:

decoding and inversely quantizing the coded data to obtain the frequency domain audio signal data;

computing from the coded data one of the number of scale bits composed of the number of bits corresponding to the scale value of the coded data and the number of spectrum bits composed of the number of bits corresponding to the spectrum value of the coded data;

estimating a quantization error of correcting the frequency domain audio signal data based on one of the number of scale bits and the number of spectrum bits of the coded data;

computing a correction amount based on the estimated quantization error;

correcting the frequency domain audio signal data obtained by the frequency domain data obtaining unit based on the computed correction amount; and converting the corrected frequency domain audio signal data corrected by the correcting step into the audio signal.

* * * * *